(12) United States Patent
Johnson et al.

(10) Patent No.: US 12,082,521 B2
(45) Date of Patent: Sep. 10, 2024

(54) SYSTEM AND METHOD FOR DETECTING VIABILITY OF SEEDS

(71) Applicant: Deere & Company, Moline, IL (US)

(72) Inventors: Scott C. Johnson, Fargo, ND (US); Michael L. Rhodes, Richfield, MN (US); Matt D. Bartelson, Bettendorf, IA (US)

(73) Assignee: Deere & Company, Moline, IL (US)

( * ) Notice: Subject to any disclaimer, the term of this patent is extended or adjusted under 35 U.S.C. 154(b) by 799 days.

(21) Appl. No.: 17/301,133

(22) Filed: Mar. 26, 2021

(65) Prior Publication Data

US 2022/0039310 A1 Feb. 10, 2022

Related U.S. Application Data

(60) Provisional application No. 62/706,264, filed on Aug. 7, 2020.

(51) Int. Cl.
| | |
|---|---|
| *A01C 7/10* | (2006.01) |
| *A01C 1/06* | (2006.01) |
| *A01C 1/08* | (2006.01) |
| *A01C 7/08* | (2006.01) |
| *A01C 23/04* | (2006.01) |

(52) U.S. Cl.
CPC ............... *A01C 7/105* (2013.01); *A01C 1/06* (2013.01); *A01C 7/082* (2013.01); *A01C 1/08* (2013.01); *A01C 23/047* (2013.01)

(58) Field of Classification Search
CPC .. A01C 7/105; A01C 1/06; A01C 1/08; A01C 7/082; A01C 23/047; A01C 7/102; A01C 7/10; A01C 7/08; A01C 7/00; A01C 7/081; A01C 23/04; A01C 23/00
See application file for complete search history.

(56) References Cited

U.S. PATENT DOCUMENTS

| | | |
|---|---|---|
| 4,572,666 A | 2/1986 | Satake |
| 7,851,722 B2 | 12/2010 | Ito et al. |
| 8,054,458 B2 | 11/2011 | Baker |
| 8,631,749 B2 | 1/2014 | Sauder et al. |
| 9,557,278 B1 | 1/2017 | Itagi et al. |
| 2020/0288629 A1 | 9/2020 | Bartelson et al. |

OTHER PUBLICATIONS

Extended European Search Report and Written Opinion issued in European Patent Application No. 21185153.0, dated Jan. 24, 2022, in 05 pages.

(Continued)

*Primary Examiner* — Christopher J. Novosad

(57) ABSTRACT

A first source of an electromagnetic signal is configured to illuminate or radiate the evaluation channel through which a series of particular seeds pass. For example, the electromagnetic signal comprises a pulse with at a primary reference phase and primary reference magnitude. A first receiver of the electromagnetic signal comprises a detector to determine or identify a first seed-related characteristic (e.g., first seed characteristic) based on an observed primary phase and an observed primary magnitude. For instance, a seed treatment device is configured to treat or spray discharged particular seed with a seed treatment based on the estimated characteristic, or to reject non-conforming seeds that do not meet seed specifications.

20 Claims, 8 Drawing Sheets

(56) References Cited

OTHER PUBLICATIONS

Real-time sorting of melon seed using hyperspectral shortwave infrared imaging, dated May 15, 2018, pp. 1-3, [online]. Retrieved from the internet <URL: https://www.spiedigitallibrary.org/conference-proceedings-of-spie/10665/106650l/Real-time-sorting-of-melon-seed-using-hyperspectral-shortwave-infrared/10.1117/12.2307699.short?SSO=1>.
Changyeun Mo et al., Non-destructive quality evaluation of pepper (*Capsicum annuum* L.) seeds using LED-induced hyperspectral reflectance imaging, Sensors, Apr. 24, 2014, pp. 7489-7504, doi: 10.3390/s140407489.
Dewi Kusumaningrum et al., Non-destructive technique for determining the viability of soybean (Glycine max) seeds using FT-NIR spectroscopy, Aug. 31, 2017, pp. 1734-1742, doi: 10.1002/jsfa.8646.
Advances in technologies for seed science and seed testing, dated 2017, pp. 18-22, [online]. Retrieved from the internet <URL: https://www.researchgate.net/publication/319018505_Advances_in_technologies_for_seed_science_and_seed_testing>.
Henry Bruggink et al., X-ray Based Seed Analysis, Seed Testing International Apr. 2017, pp. 45-50.
Satake, Colour and Optical Sorting Machines, [online]. Retrieved from the internet <URL: https://www.satake.com.au/colour-sorting-optical-sorting/>.

SYSTEM AND METHOD FOR DETECTING VIABILITY OF SEEDS

RELATED APPLICATION

This document (including the drawings) claims priority and the benefit of the filing date based on U.S. provisional application No. 62/706,264, filed Aug. 7, 2020 under 35 U.S.C. § 119 (e), where the provisional application is hereby incorporated by reference herein.

DISCLOSURE

This disclosure relates to a system and method for detecting viability of seeds.

BACKGROUND

In certain prior art, sensors may be used to detect seed quality in a lab setting or at a seed provider to avoid planting inferior seed or damaged seed. However, damage to seed may occur during storage of the seed or after delivery from the lab or seed provider. During planting operations of a planter, the real-time detection and rejection of damaged or inferior seed on a planter can present timing and other technical problems. Accordingly, there is need for a system and method for detecting viability of seeds that is integral with a planter or planting row unit.

SUMMARY

In accordance with one embodiment, a system or method for detecting viability uses or incorporates a seed meter. A seed meter comprises a rotor with slots that are spaced apart from each other. Each slot has a suitable shape and size to receive a corresponding seed. The seed meter has an entrance port for receiving seed into the seed meter and an exit port for seed exiting from the seed meter, where each exiting seed is generally spaced spatially (e.g., by a metered distance) from any prior seed or later seed exiting the exit port. A conveyer is configured to convey seed exiting the seed meter from the exit port to a seed discharge port for depositing or planting the seed in a furrow in the ground.

In accordance with another aspect, the system or method comprises an evaluation channel (e.g., evaluation channel section) through which a series of seeds pass. A first source of an electromagnetic signal is configured to illuminate or radiate the evaluation channel. For example, the electromagnetic signal comprises a pulse with at a primary reference phase and primary reference magnitude. A first receiver of the electromagnetic signal comprises a detector to determine or identify a first seed-related characteristic (e.g., first seed characteristic) based on an observed primary phase and an observed primary magnitude.

For instance, a primary evaluator is configured to evaluate a first difference between the primary reference phase and the primary observed phase and a second difference between the primary reference magnitude and observed primary magnitude to estimate the first seed-related characteristic of one or more particular seeds in the series of seeds in the evaluation channel section or upstream evaluation channel. The particular seed is treated, stored or rejected based on the estimated characteristic.

DETAILED DESCRIPTION

As used in this document, a module means software, electronics, or both, where software can include software instructions, executable files, data structures, and libraries, among other things. The blocks in block diagrams may represent modules. The lines that interconnect the blocks in the block diagrams may represent any of the following: physical communication lines, transmission lines, microstrip, stripline, conductive traces on circuit boards, coaxial cable, conductors, cables, or wires; analog signals, digital signals, logic level signals, Boolean logic signals, data messages, data communications, system calls, calls between software modules, dynamic linking between software modules, static linking between software modules, compiling software in one or more executable files, and communications of data between software modules.

As used in this document, configured to, adapted to, and arranged to may refer any of the following items: (1) software or program instructions that are stored in the data storage device 30 or other data storage and executable by the electronic data processor 24 to perform certain functions, software, (2) software or embedded firmware that are stored in a controller 22, a driver, an inverter or its or their memory or data storage to perform certain functions, or (3) electronic, electrical circuits, logic circuits, digital logic circuits, or modules that can perform substantially equivalent functions to the software, embedded firmware or program instructions.

Figure 1:
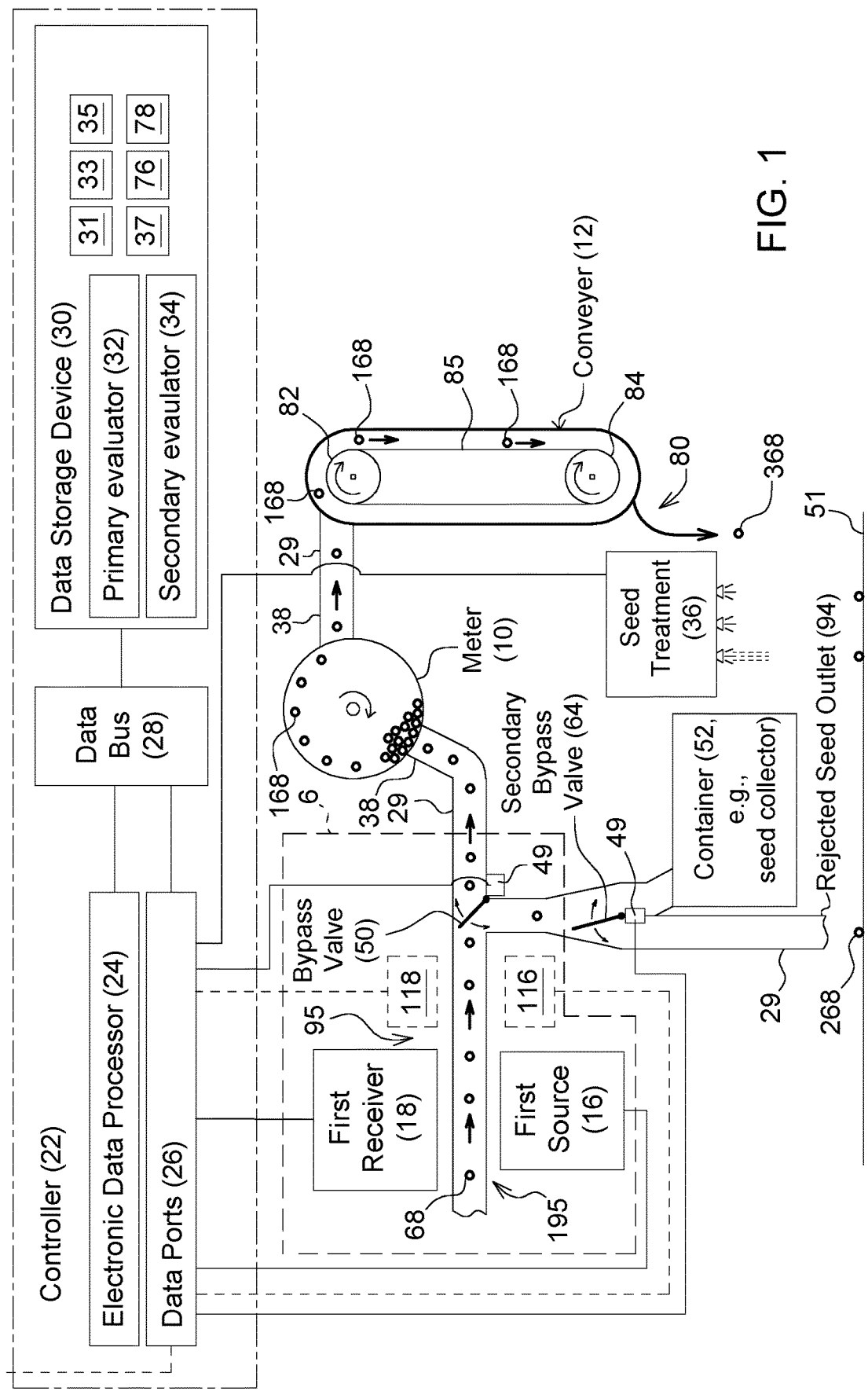
FIG. 1 is a block diagram of a first embodiment of a system for detecting viability of a seed.

FIG. 1 is a block diagram of a first embodiment of a system for detecting viability of a seed. In accordance with FIG. 1, a controller 22 comprises an electronic data processor 24, a data storage device 30, and data ports 26 coupled to a data bus 28. The electronic data processor 24, the data storage device 30 and the data ports 26 may communicate data messages or signals with each other via the data bus 28.

The electronic data processor 24 may comprise a microcontroller, a microprocessor, a multi-core data processor, a parallel, multi-processor configuration, a digital signal processor (DSP), an application specific integrated circuit (ASIC), a programming logic array, an arithmetic logic unit, a Boolean logic unit, a digital logic circuits, or the like.

In one embodiment, data storage device 30 may comprise electronic memory, non-volatile, random-access electronic memory, an magnetic storage device, an optical storage device, or another storage device for storing digital data, analog data, or both.

In one configuration, each data port may comprise a data buffer, a data transceiver or another interface between the controller 22 and other electronic devices, network devices, sensors, circuitry or controllers 22.

In one embodiment, a first source 16 and a first receiver 18 are coupled to the controller 22. For example, the first source 16 and the first receiver 18 are coupled to the data ports 26 of the controller 22. Further, the first source 16 and the first receiver 18 may be coupled to the data ports 26 via a transmission lines, cables, wires, or conductors. However, in an alternate embodiment, the first source 16 and first receiver 18 may be coupled to the data ports 26 via a wireless link, such as a combination of a wireless transmitter and a wireless receiver, or two wireless transceivers in communication with each other.

In one embodiment, an optional second source 116 and an optional second receiver 118 are coupled to the controller 22, where the optional second course and the optional second receiver 118 are illustrated in dashed lines to indicate their optional character. For example, the second source 116 and the second receiver 118 are coupled to the data ports 26 of the controller 22. Further, the second source 116 and the second receiver 118 may be coupled to the data ports 26 via a transmission lines, cables, wires, or conductors. However, in an alternate embodiment, the second source 116 and second receiver 118 may be coupled to the data ports 26 via a wireless link, such as a combination of a wireless transmitter and a wireless receiver, or two wireless transceivers in communication with each other.

Alternately, the first source 16, the optional second source 116, the first receiver 18, and the optional second receiver 118 may be coupled to the data ports 26 or the controller 22 via a local area network, or one or more wireless devices, such as wireless network router or a wireless network transceiver that is compatible with the IEEE 802.11 (e.g., informally referred to as Wi-Fi) standard or another applicable communications standard.

In accordance with one embodiment, a system or method for detecting viability uses or incorporates a seed meter 10. Further, in one configuration, the seed meter 10 comprises a rotatable rotor with slots 86 that are spaced apart from each other; each slot has a suitable shape and size to receive a corresponding seed. The seed meter 10 has an entrance port 38 for receiving seed into the seed meter 10 and an exit port 39 for seed exiting from the seed meter 10, where each exiting seed is spaced spatially (e.g., by a metered distance or separation distance) from any prior seed or later seed exiting the exit port. A conveyer 12 may comprise a brush belt 85 or similar device for receiving the seed from the exit port 39 of the seed meter 10. The conveyer 12 is configured to convey seed exiting the seed meter 10 from the exit port 39 to a seed discharge port 80 of the row unit. The discharge port may comprise an opening, or an opening and a deflector, shield, tube or other seed-directing device associated with the discharge port. The conveyer 12 facilitates depositing or planting the seed in a furrow, groove, opened channel 29 in the ground, or on the ground or soil.

In practice, a leading or front portion of the row unit may have an opener that opens a furrow, groove, or opened channel 29 in the soil prior to planting the seed. For example, the opener comprises one or more discs, where two discs are open arranged in a wedge pattern at the front of a row unit. A trailing or rear of the row unit may have a closer that closes the furrow, groove or opened channel 29 in the soil after planting the seed. closer of the row unit may comprise one or more closing wheels with circumferential blades, serrations, grooves, spokes, curved or radial spikes or other projecting members.

As illustrated, the data storage device 30 stores, retrieves, manages, reads, or facilitates execution or data processing of a primary evaluator 32, a secondary evaluator 34, a synchronization module 31 (e.g., timer), seed treatment control module 33, reference phase data 35, reference attenuation data 37, seed characteristic data 76, and bypass valve control module 78.

In accordance with FIG. 1, the system or method comprises an evaluation channel 95 section through which a series of seeds 68 pass. For example, as illustrated in FIG. 1, the evaluation channel 95 (e.g., evaluation channel section) comprises an upstream evaluation channel 195 that is located in accordance with one or more of the following: (a) prior to a seed meter 10 in a planting row unit, or (b) between a seed hopper 19 and a seed meter 10 in a planting row unit, or (c) between an input of a pneumatic seed supply line for a planting row unit and the seed meter 10 in the planting row unit.

A first source 16 (e.g., first transmitter) of an electromagnetic signal 92 is configured to transmit, illuminate or radiate the evaluation channel 95 or the upstream evaluation channel 195. For example, the electromagnetic signal 92 comprises a pulse (e.g., first pulse or first pulse train) with a primary reference phase and at primary reference magnitude. The electromagnetic signal 92, pulse (e.g., first pulse) or pulse train (e.g., first pulse train) may comprise any of the following frequency ranges or wavelength ranges: humanly visible light, ultraviolet light, infra-red, radio and microwave, and even X-rays. A first receiver 18 of the electromagnetic signal 92 comprises a detector to determine or identify a first seed-related characteristic (e.g., first seed characteristic) based on an observed primary phase and an observed primary magnitude, or based on changes in the first pulse or first pulse train transmitted by the first source 16. A first seed related characteristic may include one or more of the following items: a seed viability; misshapen, distorted, broken or damaged seed; diseased or moldy seed, infected or infested seed, seed species, seed type, or other seed parameters.

In one embodiment, a first wireless arrangement comprises a combination of the first source 16 and the first receiver 18. The first source 16 may comprise a transmitter of the electromagnetic signal 92, or first pulse or pulse train of a primary reference phase and primary reference magnitude. The first receiver 18 comprises a receiver for receiving or detecting the observed magnitude and observed phase of the received or reflected electromagnetic signal 92, or first pulse or first pulse train. The first receiver 18 may comprise a phase measurement device and a signal strength indicator device, for instance.

In accordance with yet another aspect, an primary evaluator 32 or electronic data processor 24 is configured to evaluate a first difference between the primary reference phase and the primary observed phase and a second difference between the primary reference magnitude and primary observed magnitude to estimate a first seed-related characteristic of one or more seeds 68 in the series of seeds 68 in the evaluation channel 95 section or upstream evaluation channel 195. For example, the electronic data processor 24 retrieves, reads or accesses the primary reference magnitude and primary reference phase stored in the data storage device 30 to determine the first difference and the second difference.

An optional second source 116 (e.g., second transmitter) of an electromagnetic signal 92 is configured to transmit, illuminate or radiate the evaluation channel 95 or the upstream evaluation channel 195. For example, the electromagnetic signal 92 comprises a pulse (e.g., second pulse or second pulse train) with a secondary reference phase and at secondary reference magnitude. A first receiver 18 of the electromagnetic signal 92 comprises a detector to determine or identify a second seed-related characteristic (e.g., second seed characteristic) based on an observed secondary phase and an observed secondary magnitude, or based on changes in the second pulse or second pulse train transmitted by the optional second source 116. A second seed related characteristic may include one or more of the following items: a seed viability; misshapen, distorted, broken or damaged seed; diseased, rotten, decayed or moldy seed; infected or infested seed; seed species, seed type, or other seed parameters.

In one embodiment, a second wireless arrangement comprises a combination of the optional second source 116 and the optional second receiver 118. The second source 116 may comprise a transmitter of the electromagnetic signal 92, or second pulse or second pulse train of a secondary reference phase and secondary reference magnitude. The second receiver 118 comprises a receiver for receiving or detecting the observed magnitude and phase of the received or reflected electromagnetic signal 92, or second pulse or second pulse train. The second receiver 118 may comprise a phase measurement device and a signal strength indicator device, for instance.

An optional secondary evaluator 34 is indicated by dashed lines. For example, the secondary evaluator 34 or electronic data processor 24 is configured to evaluate a third difference between the secondary reference phase and the secondary observed phase and a fourth difference between the secondary reference magnitude and secondary observed magnitude to estimate a second seed-related characteristic of one or more seeds 68 in the series of seeds 68 in the evaluation channel 95 section or upstream evaluation channel 195. For example, he electronic data or secondary evaluator 34 processor 24 retrieves, reads or accesses the secondary reference magnitude and secondary reference phase stored in the data storage device 30 to determine the third difference and the fourth difference. A second seed related characteristic may include one or more of the following items: a seed viability; misshapen, distorted, broken or damaged seed; diseased, rotten, decayed or moldy seed; infected or infested seed; seed species, seed type; or other seed parameters.

In one embodiment, the synchronization module 31 is configured to estimate a time period or delay associated with a transit of a particular seed, with a corresponding (previously) identified first seed-related characteristic and/or second-seed related characteristic in a row unit. The time period or delay associated with transit of a particular seed in the row unit is estimated or adjusted in accordance with various techniques, which may be applied separately or cumulatively. In one configuration as a particular seed or series of seeds 68 progresses through the respective row unit, the time period or delay is tracked to allow one or more particular seeds 68 detected in the evaluation channel 95 to be routed properly in real time (e.g., in transit), by control of one or more bypass valves within the row unit, to one of following: (a) rejected seed outlet 94, (b) container 52 (e.g., seed collector), and (c) discharge port 80 or discharge zone. Further, as a particular seed or series of seeds 68 progresses through the respective row unit, the time period or delay is tracked to allow one or more particular seeds 68 detected in the evaluation channel 95 to be treated properly in real time by the seed treatment device 36 that applies crop input (e.g., pesticide, fertilizer, nutrients, inoculation, mildewcide, insecticide, fungicide) to the seeds 68 or seedbed 51 in which the seeds 68 are or will be planted.

Under a first technique, a time period or delay associated with a transit of a particular seed in a row unit may be associated with the duration during which the particular seed is moved between the evaluation channel 95 section and discharge port 80 (of the planting row unit).

Under a second technique, the time period or delay associated with a transit of a particular seed in a row unit may be adjusted or reduced by a data processing time of the electronic data processor 24 to determine the first seed-related characteristic and/or second seed related characteristic.

Under a third technique, the time period or delay associated with a transit of a particular seed in a row unit may be adjusted or reduced by a processing time of the electronic data processor 24 to determine bypass valve settings or control bypass valve settings to properly direct particular seeds 68 to the rejected seed outlet 94, the container 52 (e.g., seed collector) or to planting in the furrow or ground.

Under a fourth technique, a time period or delay associated with a transit of a particular seed in a row unit may be associated with the duration that is measured with reference to or from a reception time, measurement time or detection time of the transmitted pulse by the first source 16 or a reflected pulse, where the first source 16, the first receiver 18 or both provide a triggering pulse, pulse edge, synchronization signal, initialization signal or data message to the electronic data processor 24 or the synchronization module 31 to facilitate measurement or estimation of the above time period or delay. The synchronization module 31 may comprise a timer or clock data estimate the time period or the delay, the electronic data processor 24 may execute or emulate the synchronization module 31.

In one embodiment, a seed treatment control module 33 is configured to control or operate a seed treatment device 36 to treat timely or to spray timely a discharged seed 368, or a treatment zone in the furrow or in the ground, with a seed treatment based on the estimated characteristic and the estimated delay or time period that is synchronized to the arrival, planting or discharge of the particular seed in a discharge or planting zone. The seed is planted in a seed discharge zone or seed landing zone within a seedbed 51 or furrow, which is typically created by an opener on the planting row unit. The seed treatment is associated with a seed treatment zone, which may overlap with or be coextensive with the seed discharge zone or seed landing zone, depending upon alignment of one or more nozzles 70 of the row unit. For example, seed treatment may comprise any of the following items: treatment, crop input, liquid or granular fertilizer, pesticide, fertilizer, nutrients, inoculation, insecticide, herbicide, fungicide, mildewcide, insecticide, or biological agents which can be placed on the seed based on the diagnosis from the array of sensors prior to planting. For example, real-time analysis and the seed treatment reduces the amount or volume of seed treatment that applied to the seeds 68 or seedbed 51 by limiting it to particular seeds 68 that are detected to require such treatment in the evaluation channel 95, rather than treating all seeds 68. The expense of crop inputs can be matched with particular seeds 68 or series of seeds 68 to reduce fertilizer application and other treatments, consistent with recommendations or plans of the grower or consultant, as needed or as required in accordance with regulatory or environmental guidelines, and/or as required by best practices or crop insurance programs.

In one embodiment, the seed treatment control module 33, the seed treatment device 36 and the synchronization module 31 can operate in accordance with various examples that may be applied separately and cumulatively, where the seed treatment control module 33 and the synchronization module 31 may comprise software instructions that are stored in the data storage device 30 and executable by the electronic data processor 24.

In a first example, the seed treatment control module 33, the seed treatment device 36 and the synchronization module 31 support real-time application of fertilizer (or supplemental fertilizer) to a corresponding particular seed if the first seed-related characteristic and/or the second seed-related characteristic comprise a synthetic fertilizer coating or casing is damaged on a particular seed. In a first example, the seed treatment control module 33, the seed treatment device 36 and the synchronization module 31 support real-time application of fungicide (or supplemental fungicide) to a corresponding particular seed if the first seed-related characteristic and/or the second seed-related characteristic comprise a synthetic fungicide coating or casing is damaged on a particular seed. In a third example, the seed treatment control module 33, the seed treatment device 36 and the synchronization module 31 support real-time application of insecticide (e.g., additional insecticide) to a corresponding particular seed if the first seed-related characteristic and/or the second seed-related characteristic comprise signs or indicators of insect damage or visible insect activity, along with adequate indicator(s) of potential seed viability. In a fourth example, the seed treatment control module 33, the seed treatment device 36 and the synchronization module 31 support real-time application of fungicide (e.g., supplemental fungicide) to a corresponding particular seed if the first seed-related characteristic and/or the second seed-related characteristic comprise fungicide if the particular seed is viable but has fungus or mold detected.

In one embodiment as illustrated in FIG. 1, the evaluation channel 95 section is associated with a channel 29 that feeds the seed meter 10 with seed. In FIG. 1, a seed hopper 19, gravity fed tube, or pneumatic seed tube may provide series of seeds 68 to the evaluation channel 95 section. As the planting row unit progresses through a field or work area, the seeds 68 flow or are conveyed to the entrance port 38 of the seed meter 10. In one configuration, the seed meter 10 comprises a rotatable disc 90 with seed-receiving slots 86 around its periphery or outer circumference, where the seed-receiving slots 86 are spaced apart radially. The seed meter 10 facilitates achieving a target planted seed density, such target seeds 68 per row, target seeds 68 planted per row length (e.g., distance), or seeds 68 per land area (e.g., acre or hectare). For example, the seeds 68 can be spaced apart in the row or furrow by an equal distance or equal separation that generally is proportional to the rotational velocity of the rotatable disc 90, the radial separation between adjacent seed-receiving slots 86 of the rotatable disc 90 and motion data (e.g., vehicle or row unit velocity and/or acceleration) provided by a motion sensor 41. Alternately, the seeds 68 can be spaced apart in the row or furrow by a variable distance or variable separation to provide a variable seed density (e.g., based on pre-mapped soil condition, pre-mapped field elevation or field management zones identified by the motion sensor 41) that generally is proportional to the rotational velocity of the rotatable disc 90, the radial separation between adjacent seed-receiving slots 86 of the rotatable disc 90 and motion data (e.g., vehicle or row unit velocity and/or acceleration) provided by a motion sensor 41.

In one configuration, the motion sensor 41 comprises a ground speed sensor comprising any of the following to provide motion data: odometer, speedometer, ground speed radar, location-determining receiver, satellite navigation receiver, satellite navigation receiver (e.g., Global Positioning System) receiver with differential correction, real-time kinematic (RTK) correction, and/or precise point positioning (PPP) correction. Motion data may refer to position data, position data versus time, velocity, acceleration, attitude angle, velocity or acceleration; roll, tilt, yaw angle, velocity or acceleration.

In one embodiment, a conveyer 12 or input port is coupled to the seed meter 10 or the exit port of the seed meter 10. As illustrated the conveyer 12 has a first rotor 82 and a second rotor 84 that drive a belt 85, cogged belt 85, a brush belt 85, a chain or other rotating member for transporting seeds 68 that are spaced apart from each other. A brush belt 85 may comprise brush bristles, brush hairs, synthetic plastic fingers, synthetic a polymer fingers, synthetic rubber, elastomer members, pockets, scoops, shelves, or individual seed retainers 87 (e.g., individually or collectively retaining members) that are coupled to a belt 85 to retain seeds 68 and maintain/preserve spatial separation between adjacent seeds 68 as the conveyer 12 or belt 85 moves the seeds 68 from an input port of the conveyer 12 to a discharge port 80 of the conveyer 12 and the row planting unit. The first rotor 82, or the first rotor 82 and the second rotor 84, may be associated with an electric drive motor and a motor controller. The second rotor 84 may be associated with a separate, second electric drive motor and a separate, second motor controller from a first electric drive motor and first motor controller that drives the first rotor 82. For instance, each electric drive motor may comprise an alternating current permanent magnet drive motor and the motor controller may comprise an inverter or bi-directional inverter that can operate in a motoring mode or a braking mode.

As illustrated in FIG. 1, the row unit may have one or more bypass valves such as a primary bypass valve 50 and a secondary bypass valve 64. The primary bypass valve 50 and the secondary bypass valve 64 may comprise an electromechanical device that can open and close a flap or valve to route or direct one or more seeds 68 to a particular channel 29 or destination, such as a rejected seed outlet 94, a seedbed 51, or a container 52 (e.g., seed collector). One or more bypass valves are connected to or coupled to the data ports 26 of the controller 22 via transmission lines, wires, cables or conductors. Alternately, the bypass valves are coupled to the data ports 26 of the controller 22 via a wireless link or wireless network, such as local area network on a vehicle. The electronic data processor 24, alone or together, with a valve control module in the data storage device 30 may control, generate control signals, or control data messages to control the state, opening or closing of the respective flaps valves based upon logic or a set of rules that are associated with the first seed-related characteristic, the second seed-related characteristic, or both.

An optional motion sensor 41 is coupled to the controller 22 or the data ports 26 of the controller 22. The optional motion sensor 41 is indicated by dashed lines in FIG. 1. The motion sensor 41 may comprise a ground speed sensor, such as a radar device, an odometer, a speedometer, or a location-determining receiver. In one embodiment, a location-determining receiver comprises any global navigation satellite system receiver (GNSS), such as a global positioning system (GPS) receiver, where the receiver may be associated with a receiver or transceiver for receiving a correction, such as a differential correction signal or an local real-time kinematic (RTK) base-station correction signal.

The electronic data processor 24 or the valve control module may control or operate the primary bypass valve 50, the secondary bypass valve 64, or both, via its respective electromagnetic actuator 49, to in accordance with one or more techniques, that may be applied cumulatively or separately. The electromagnetic actuator 49 may comprise a linear actuator 49, an electric motor coupled to a screw mechanism or screw gear, a servo-motor, a solenoid, or the like.

Under a first technique, the electronic data processor 24 or the valve control module may control the primary bypass valve 50, the secondary bypass valve 64, or both, via one or more respective electromagnetic actuators 49, to route, direct or divert particular seeds 68, or seed portions, to the ground, where the particular seeds 68 are associated with respective first seed-related characteristics and/or second seed related characteristics in accordance with one or more of the following detected parameters: nonviable seed, sterile seed, previously diseased, non-infectious seed, moldy seed, deformed seed, decayed seed, cracked seed, seed fragments, incorrect seed type, incorrect seed species (e.g., soybeans versus maize or corn), untreated seeds 468, uncoated seeds 68, or any other seed characteristics which are deemed safe, as low risk for contamination or infection of the planted seeds 68 or crop, or best practice for disposal in the field or on the ground. For example, the electronic data processor 24 or the valve control module may control the primary bypass valve 50 and the secondary bypass valve 64 to divert nonviable, sterile, previously diseased non-infectious, moldy, deformed, decayed, cracked, seed fragments, incorrect seed, or other rejected seeds 268 to the ground or rejected seed outlet 94, where the rejected seeds, or rejected seed portions, will not contaminate or infect the planted seeds 68 or crop.

Under a second technique, the electronic data processor 24 or the valve control module may control the primary bypass valve 50, the secondary bypass valve 64, or both, via one or more respective electromagnetic actuators 49 (which are synonymous with bypass valve actuators), to route, direct or divert particular seeds 68, or seed portions, to the container 52, where the particular seeds 68 are associated with respective first seed-related characteristics and/or second seed related characteristics in accordance with one or more of the following detected parameters: nonviable seed, currently diseased seed, previously diseased seed, infected seed, insect-infested seed, moldy seed, deformed seed, decayed seed, cracked seed, seed fragments, incorrect seed type, incorrect seed species (e.g., soybeans versus maize or corn), untreated seeds 468, uncoated seeds 68, or any other seed characteristics which are deemed as high risk for contamination or infection of the planted seeds 68 or crop, or best practice for storing in the container 52 or seed collector. For example, the electronic data processor 24 or the valve control module may control the primary bypass valve 50 and the secondary bypass valve 64 to divert nonviable, previously diseased, currently diseased, infected, insect-infested, moldy, deformed, decayed, cracked, seed fragments, incorrect seed, or other rejected seeds 268 to the container 52 or seed collector, where the rejected seeds 268, or rejected seed 268 portions, cannot contaminate or infect the planted seeds 68 or crop in the field.

Under a third technique, the electronic data processor 24 or the valve control module may control the primary bypass valve 50, the secondary bypass valve 64, or both, via one or more electromagnetic actuators 49, to divert, route or direct incorrect variety or species of seeds 68 to a container 52 (e.g., seed collector) for later processing, sorting, distribution or planting with like seed species or varieties, such as in another field location or geographic location. For example, the electronic data processor 24 or the valve control module may control the primary bypass valve 50, the secondary bypass valve 64, or both, via one or more electromagnetic actuators 49, to divert, route or direct a first species (e.g., corn or maize) of a particular seed to the discharge port 80 of the conveyer 12 for planting, whereas electronic data processor 24 or the valve control module may control the primary bypass valve 50, to divert, route or direct a second species (e.g., soybeans or non-corn or non-maize seeds 68) of a particular seed to a container 52 (e.g., seed collector) for later processing, sorting, distribution or planting. Similarly, the electronic data processor 24 or the valve control module may control the primary bypass valve 50, the secondary bypass valve 64, or both, via one or more electromagnetic actuators 49, to divert, route or direct a first species (e.g., soybeans) of a particular seed to the discharge port 80 of the conveyer 12 for planting, whereas electronic data processor 24 or the valve control module may control the primary bypass valve 50, to divert, route or direct a second species (e.g., corn or maize or non-soybean seeds 68) of a particular seed to a container 52 (e.g., seed collector) for later processing, sorting, distribution or planting.

Under a fourth technique, the electronic data processor 24 or the valve control module may control the primary bypass valve 50, the secondary bypass valve 64, or both, via one or more electromagnetic actuators 49, to divert, route or direct rejected seeds 268, such as infested, nonviable, diseased, decayed, deformed, moldy, cracked, or incorrect particular seeds 68 to a container 52 (e.g., for later disposal, burning, fermenting, composting, processing or sorting).

The evaluation channel 95 section may be configured, structured, positioned or arranged in alignment with various wireless sensor arrangements, which may be applied alternately or cumulatively.

In accordance with a first configuration, which is illustrated in FIG. 1, the evaluation channel 95 comprises an upstream evaluation channel 195 that is positioned prior to a particular seed or particular series of seed reaching the seed meter 10 of the planting row unit. For example, the upstream evaluation channel 195 is positioned between a seed bin and a seed meter 10 of a row unit, or between a seed delivery tube and a seed meter 10 of a row unit. A wireless sensor arrangement is associated with the upstream evaluation channel 195, where the wireless sensor arrangement may comprise a first source 16 and one or more receivers (e.g., first receiver 18) for receiving or evaluating a signal or pulse transmitted by the source, or a reflection of the transmitted signal. The source and one or more receivers may face each other or be mounted on opposite walls of the upstream evaluation channel 195.

In an alternate embodiment, an optional wireless sensor arrangement is associated with the upstream evaluation channel 195 and is illustrated in dashed lines in FIG. 1. Here, the optional wireless sensor arrangement may comprise an optional second source 116 and an optional second receiver 118 (for receiving or evaluating a signal or pulse transmitted by the source, or a reflection of the transmitted signal. The second source 116 and second receiver 118 receivers may face each other or be mounted on opposite walls of the upstream evaluation channel 195.

Figure 2:
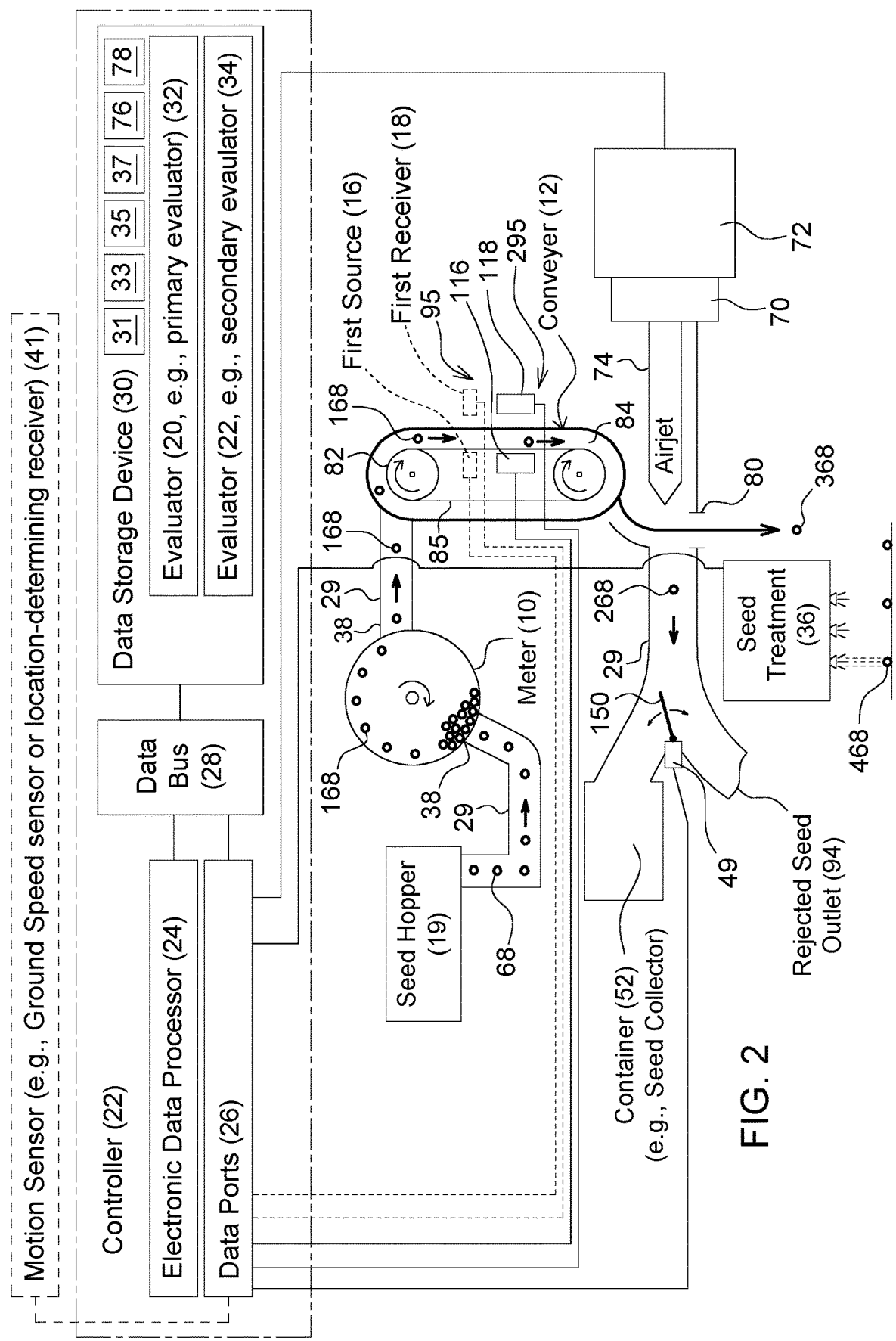
FIG. 2 is a block diagram of a second embodiment of a system for detecting viability of a seed.

In accordance with a second configuration, which is illustrated in FIG. 2, the evaluation channel 95 comprises a downstream evaluation channel 295 that is positioned after a series of seeds 68 exiting the seed meter 10 of the planting row unit. A wireless sensor arrangement is associated with the downstream evaluation channel 295, where the wireless sensor arrangement may comprise a first source 16 and one or more receivers (e.g., first receiver 18) for receiving or evaluating a signal or pulse transmitted by the source, or a reflection of the transmitted signal. The first source 16 and one or more receivers may face each other or be mounted on opposite walls of the downstream evaluation channel 295.

In an alternate embodiment, an optional wireless sensor arrangement is associated with the downstream evaluation channel 295 and is illustrated in dashed lines in FIG. 2. Here, the optional wireless sensor arrangement may comprise an optional second source 116 and an optional second receiver 118 (for receiving or evaluating a signal or pulse transmitted by the source, or a reflection of the transmitted signal. The second source 116 and second receiver 118 receivers may face each other or be mounted on opposite walls of the downstream evaluation channel 295.

Figure 3:
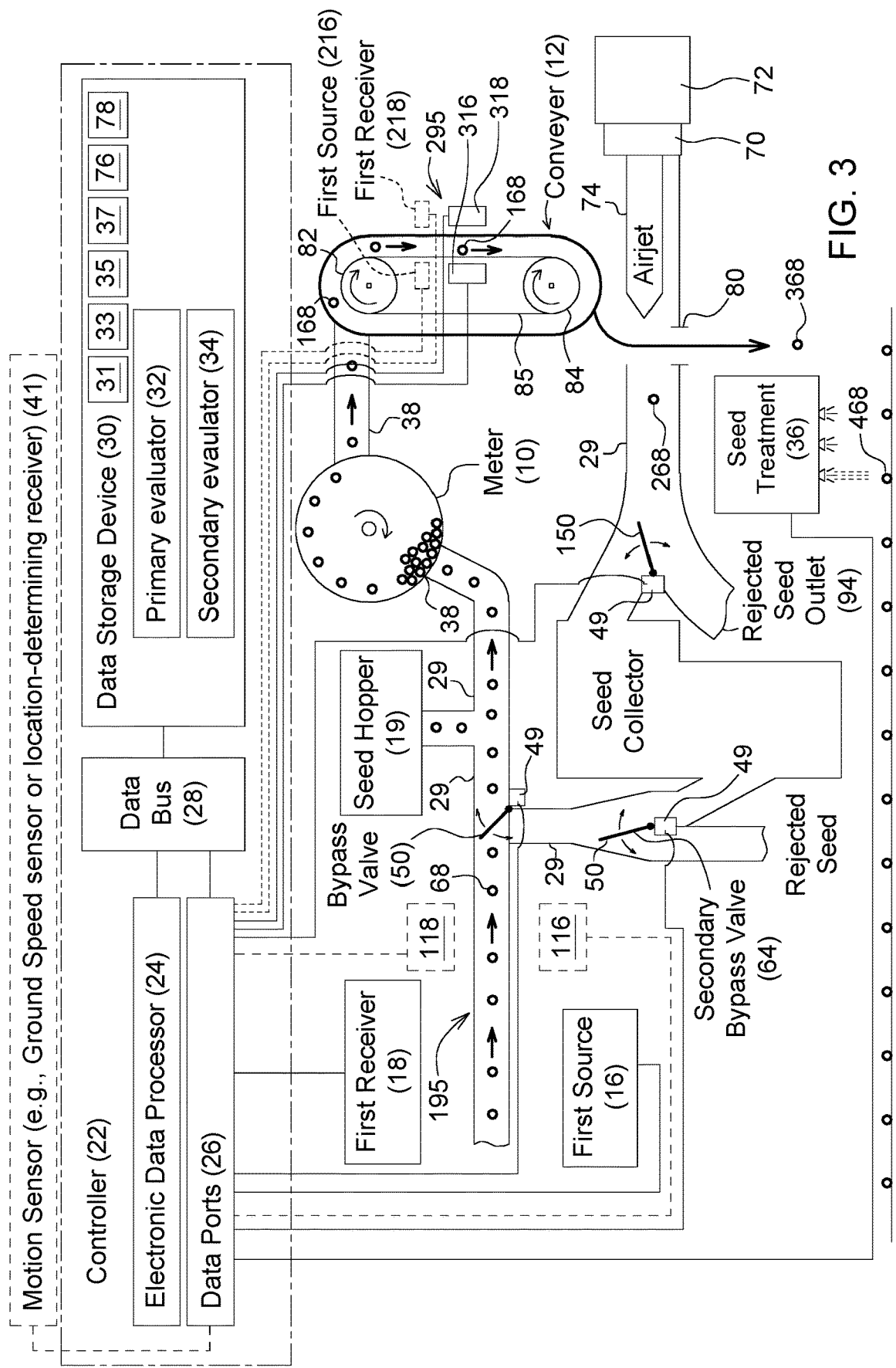
FIG. 3 is a block diagram of a third embodiment of a system for detecting viability of a seed.

In accordance with a third configuration, which is illustrated in FIG. 3, the evaluation channel 95 comprises the combination of the upstream evaluation channel 195 of FIG. 1 and the downstream evaluation channel 295 of FIG. 2.

Like reference numbers in FIG. 1 through FIG. 3 indicate like elements or features. However, in FIG. 3, the downstream wireless arrangement has relabeled the first source 16, the first receiver 18, the optional second source 116 and second receiver 118 with different reference numbers. The downstream evaluation channel 295 of FIG. 3 is positioned after a series of seeds 68 exiting the seed meter 10 of the planting row unit. A wireless sensor arrangement is associated with the downstream evaluation channel 295, where the wireless sensor arrangement may comprise a first source 16 and one or more receivers (e.g., first receiver 18) for receiving or evaluating a signal or pulse transmitted by the source, or a reflection of the transmitted signal. The first source 16 and one or more receivers may face each other or be mounted on opposite walls of the downstream evaluation channel 295.

In an alternate embodiment, an optional wireless sensor arrangement is associated with the downstream evaluation channel 295 and is illustrated in dashed lines in FIG. e. Here, the optional wireless sensor arrangement may comprise an optional second source 116 and an optional second receiver 118 (for receiving or evaluating a signal or pulse transmitted by the source, or a reflection of the transmitted signal. The second source 116 and second receiver 118 receivers may face each other or be mounted on opposite walls of the downstream evaluation channel 295.

Figure 8:
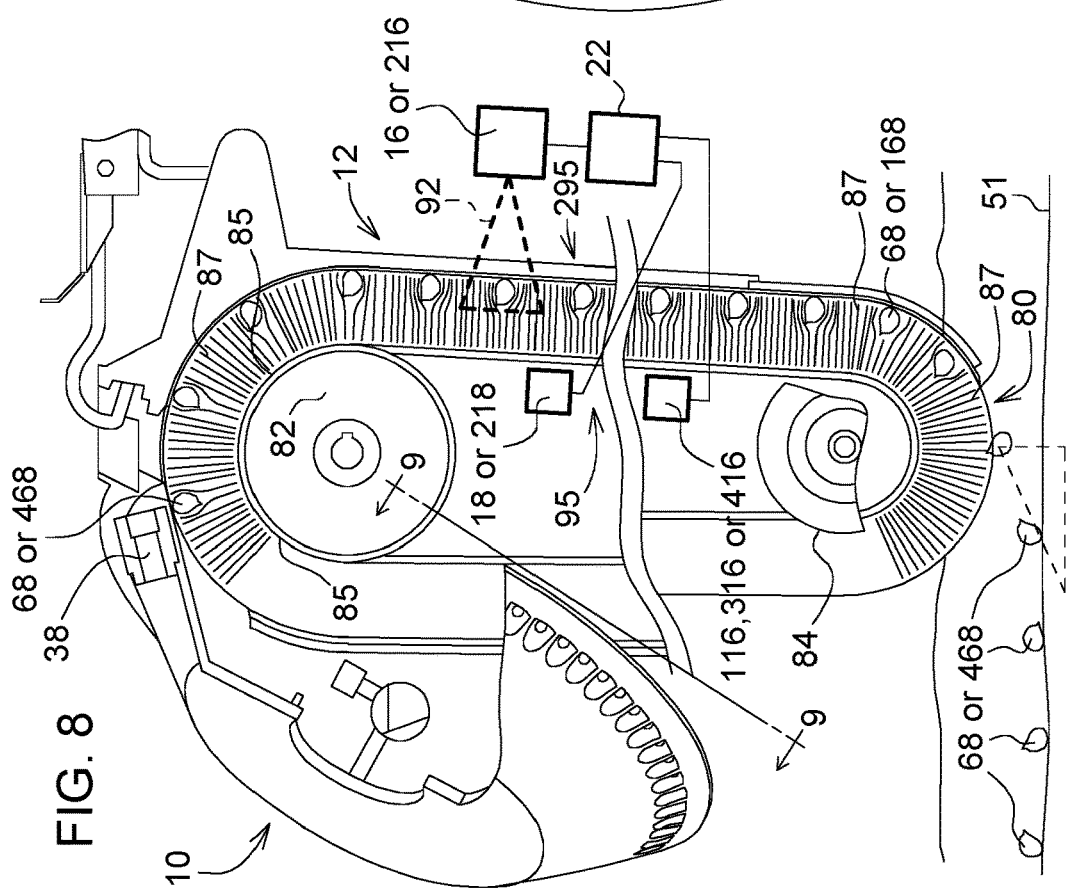
FIG. 8 is an alternate embodiment of a system for detecting viability of seed, where the system of FIG. 8 illustrates a cross-section of one possible row planting unit with one configuration of a wireless sensor arrangement.

In accordance with a fourth configuration, which is illustrated in FIG. 8, the evaluation channel 95 comprises a portion of the conveyer 12 channel 29 (e.g., brush belt channel 29) in the row unit. For example, the evaluation channel 95 may comprise a conveyer 12-evaluation channel 95 in which a conveyer 12 (e.g., comprising a brush belt 85) conveys, delivers, rotates, or transports a series of spatially separated seed from an exit port of the seed meter 10 to a discharge port 80 of the row unit for planting. In FIG. 8, a wireless sensor arrangement is associated with the conveyer 12-evaluation channel 95, where the wireless sensor arrangement may comprise a source (e.g., first source 16 or first transmitter) and one or more receivers (e.g., first receiver 18 and a second receiver 118) for receiving or evaluating a signal or pulse transmitted by the source, or a reflection of the transmitted signal. The source and one or more receivers may face each other or be mounted on opposite walls of the conveyer 12-evaluation channel 95. For example, the first receiver 18 may receive a transmitted signal or attenuated transmitted signal (of the first source 16) that propagates through one or more particular seeds 68, whereas the second receiver 118 may receive a reflected signal that is derived from the transmitted signal of the first course, but reflected from one or more particular seeds 68.

Figure 9:
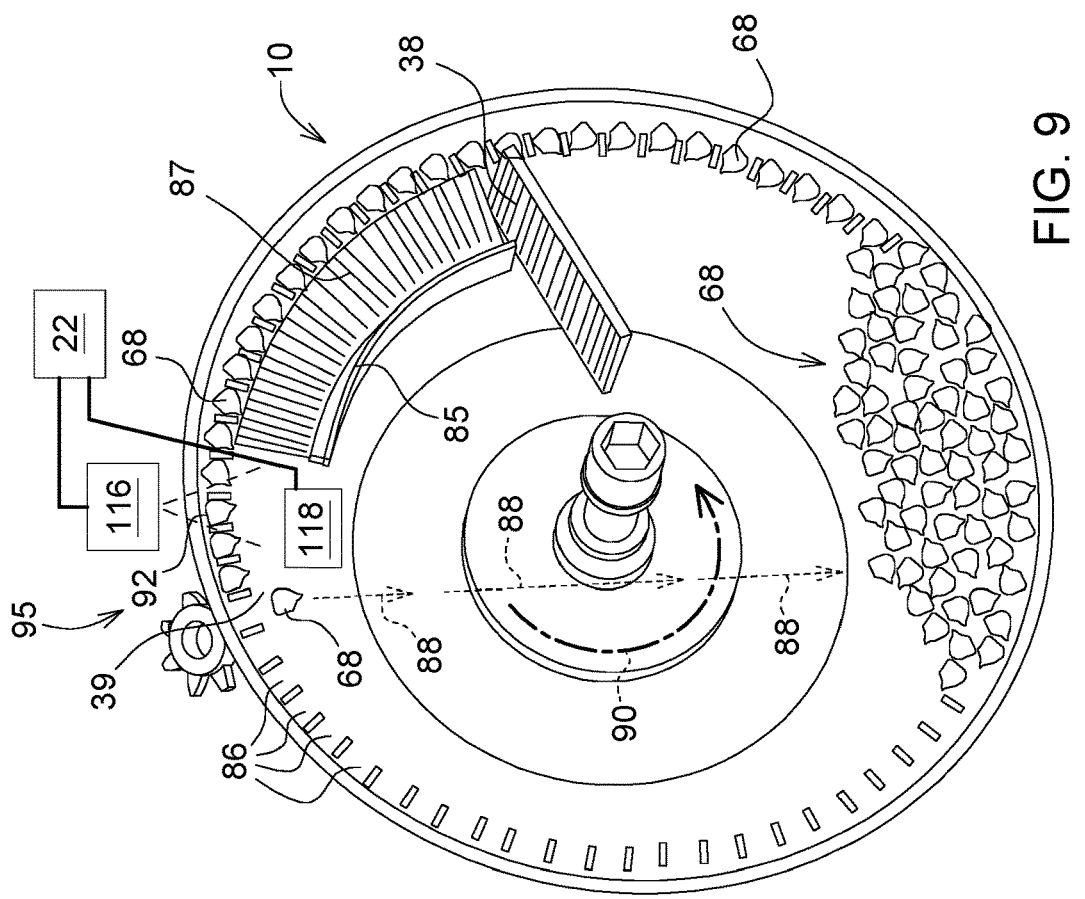
FIG. 9 is another alternate embodiment of a system for detecting viability of seed, where the system of FIG. 9 illustrates a cut-away, cross-section of a seed metering device with another configuration of a wireless sensor arrangement.

In accordance with a fifth configuration, which is illustrated in FIG. 9, the evaluation channel 95 comprises an internal portion of the seed meter 10, such as a portion between an entrance port 38 and an exit port 39 of the seed meter 10. For example, the intra-seed-meter evaluation channel 95 may be configured, aligned or positioned where seeds 68 have been positioned in slots 86 ready to be dispensed or metered by the seed meter 10. A wireless sensor arrangement is associated with the intra-seed-meter evaluation channel 95, where the wireless sensor arrangement may comprise a first source 16 and one or more receivers (e.g., first receiver 18) for receiving or evaluating a signal or pulse transmitted by the source, or a reflection of the transmitted signal. The source and one or more receivers may face each other or be mounted on opposite walls of the intra-seed meter 10 evaluation channel 95.

In FIG. 9, the seed enters the seed meter 10 at an input port from a seed hopper 19 or seed tube, after which it drops to the bottom of the disc of the seed meter 10 by gravity. As the disc rotates, seeds 68 on the bottom of the disc fall into slots 86 around the bottom perimeter or an arc of the disc. Next, the seeds 68 in the slots 86 are lifted by the rotation of the disc to an exit port of the seed meter 10 that is aligned with the conveyer 12 or brush belt 85 that accepts or receives the metered seed 168, consistent with FIG. 8.

In accordance with a sixth configuration, which is consistent with FIG. 1, the evaluation channel 95 section or upstream evaluation channel 195 is associated with a seed-carrying channel 29 between a seed hopper 19 and an entrance port 38 to the seed meter 10, where the seed-carrying channel 29 has a substantially tubular, elliptical, circular, rectangular, or polygonal cross-section, and where the seed-carrying channel 29 has a dielectric window 56, such as an optically transmissive window, or an electromagnetically transmissive window (e.g., with minimal attenuation, minimal phase distortion or defined phase distortion characteristics or group delay characteristics.)

In accordance with a seventh configuration, which is associated with FIG. 2 and FIG. 3, the evaluation channel 95 section or downstream evaluation channel 295 is associated with a seed-carrying channel 29 that receives seed from the seed meter 10, where the channel 29 is associated with the conveyer 12, where the seed-carrying channel 29 has a substantially tubular, elliptical, circular, rectangular, or polygonal cross-section, and where the seed-carrying channel 29 has a dielectric window 56, such as an optically transmissive window, or an electromagnetically transmissive window (e.g., with minimal attenuation, or minimal or defined phase distortion characteristics or group delay characteristics).

In accordance with an eighth configuration, which is consistent with FIG. 2, the evaluation channel 95 section is associated with a seed-carrying channel 29 (e.g., an intra-seed meter 10 evaluation channel 95) between the exit port 39 of the seed meter 10 and the discharge port 80, where the seed-carrying channel 29 has a substantially tubular, elliptical, circular, rectangular, or polygonal cross-section, and where the seed-carrying channel 29 has a dielectric window 56, such as an optically transmissive window, or an electromagnetically transmissive window (e.g., with minimal attenuation, minimal phase distortion and/or defined phase distortion characteristics or group delay characteristics).

In one embodiment, as illustrated in FIG. 3, a system or method for detecting viability comprises a first wireless arrangement associated with a corresponding first evaluation channel 95, or corresponding first portion of an evaluation channel 95 (e.g., upstream evaluation channel 195) and a second wireless arrangement associated with a corresponding second evaluation channel 95, or corresponding second portion of an evaluation channel 95 (e.g., downstream evaluation channel 295).

In accordance with one embodiment, a first wireless arrangement may comprise a first source 16 and a first receiver 18 associated with an evaluation channel 95 or portion of an evaluation channel 95.

In an alternate embodiment, a first wireless arrangement comprises a first source 16 and an optional second source 116 of an electromagnetic signal 92 for illuminating or radiating the evaluation channel 95, or particular seeds 68 therein. The first source 16 emits a first electromagnetic signal 92, which comprises a first pulse or pulse train with at a primary reference phase and primary reference magnitude. The second source 116 emits a second electromagnetic signal 92, which comprises a second pulse at secondary reference phase and a secondary reference magnitude.

The first receiver 18 receives the first electromagnetic signal 92, which is attenuated or reflected by one or more particular seeds 68 in the upstream evaluation channel 195, the downstream channel 29, or both, to detect or measure a first seed-related characteristic based on an observed phase shift or an observed attenuation in the primary reference phase and the primary reference magnitude of the first pulse or a reflection of the first pulse.

The optional second receiver 118 of the second electromagnetic signal 92 receives the second electromagnetic signal 92, which is attenuated or reflected by one or more particular seeds 68, to detect or measure a second seed-related characteristic based on a secondary observed phase shift or a secondary observed attenuation in the secondary reference phase and secondary reference magnitude of the second pulse or a reflection of the second pulse.

In one embodiment, a primary evaluator 32 or electronic data processor 24 is configured to evaluate a first difference between the primary reference phase and the primary observed phase and a second difference between the primary reference magnitude and primary observed magnitude to estimate a first seed-related characteristic, a secondary-seed related characteristic, or both of one or more seeds 68 in the series of seeds 68 in the evaluation channel 95 section, which comprises the upstream evaluation channel 195, the downstream evaluation channel 295, or both. Similarly, a secondary evaluator 34 or electronic data processor 24 is configured to evaluate a third difference between the secondary reference phase and the secondary observed phase and a fourth difference between the secondary reference magnitude and secondary observed magnitude to estimate first seed-related characteristic, a second seed-related characteristic, or both of one or more seeds 68 in the series of seeds 68 in the evaluation channel 95 section, which comprises the upstream evaluation channel 195, the downstream evaluation channel 295, or both.

As illustrated in FIG. 3, the system features a primary bypass valve 50, a secondary bypass valve 64, and tertiary bypass valve to direct, route or divert the particular seeds 68 in accordance to first-seed related characteristics, second-seed related characteristics. In the controller 22, the data processor 24, synchronization module 31, or bypass valve module controls the state, valve position or flap position of a primary bypass valve 50, a secondary bypass valve 64, and tertiary bypass valve to direct, route, or divert seeds 68 to the rejected seed outlet 94, the seed container 52 (e.g., seed collector), or the discharge port 80 of the conveyer 12 for planting. In FIG. 3, there are two separate paths to the rejected seed outlet 94, whereas in FIG. 1 and FIG. 2 there is only one path to the rejected seed outlet 94.

In FIG. 3, a first rejected seed 268 channel 29 is connected to the upstream evaluation seed channel 29 after the upstream evaluation channel 195, which supports the first source 16 and the first receiver 18. A primary seed bypass valve is connected to the output of the upstream evaluation seed channel 29 and inputs to the rejected seed 268 channel 29 or the seed meter 10, depending on the valve state or flap position of the primary seed bypass valve. A controller 22, alone or together with the synchronization module 31 and valve control module, is configured to control the primary bypass valve 50 to direct evaluated seed with a seed characteristic (e.g., first seed-related characteristic or second seed-related characteristic) that is not suitable for planting to the rejected seed 268 channel 29. In one configuration, a container 52 (e.g., removable container 52 or seed collector) is arranged for receiving the rejected seeds 268 from the rejected seed 268 channel 29, as further described below. A controller 22, alone or together with the synchronization module 31 and valve control module, is configured to control the primary bypass valve 50 to direct evaluated seed with a seed characteristic (e.g., first seed-related characteristic or second seed-related characteristic) that is suitable for planting, or initially detected to be suitable for planting, to the seed meter 10.

Meanwhile, a secondary bypass valve 64 is connected to the rejected seed 268 channel 29 to direct, route or divert particular seeds 68 with a seed characteristic to the rejected seed outlet 94 or the container 52 (e.g. seed collector). A controller 22, alone or together with the synchronization module 31 and valve control module, is configured to control the secondary bypass valve 64 to direct evaluated seed with a seed characteristic (e.g., first seed-related characteristic or second seed-related characteristic) that is not suitable for planting to the rejected seed outlet 94 or the container 52. A controller 22, alone or together with the synchronization module 31 and valve control module, is configured to control the secondary bypass valve 64 to direct evaluated seed with a seed characteristic (e.g., first seed-related characteristic or second seed-related characteristic) that is suitable for discarding in the field to the rejected seed outlet 94. A controller 22, alone or together with the synchronization module 31 and valve control module, is configured to control the secondary bypass valve 64 to direct evaluated seed with a seed characteristic (e.g., first seed-related characteristic or second seed-related characteristic) that is not suitable for discarding in the field to the container 52.

Even if the controller 22 does not initially divert, route, or direct the particular seed to the rejected seed 268 channel 29 at the output of the upstream evaluation module, because of the processing delay and lag, the electronic data processor 24, controller 22, synchronization module 31 can control the tertiary bypass valve to route, divert or direct particular seeds 68 to the container 52 (e.g., seed collector) or the rejected seed outlet 94. Further, even if the controller 22 does not initially divert, route, or direct the particular seed to the rejected seed 268 channel 29 at the output of the upstream evaluation module, the controller 22 may subsequently divert, route or direct the particular seed to the rejected seed 268 channel 29 at the output of the downstream evaluation module via air jet 74 activated by the pneumatic device 72 and emanating from its nozzle 70.

A tertiary bypass valve is connected to the rejected seed 268 channel 29 to direct, route or divert particular seeds 68 with a seed characteristic to the rejected seed outlet 94 or the container 52 (e.g. seed collector). A controller 22, alone or together with the synchronization module 31 and valve control module, is configured to control the tertiary bypass valve to direct evaluated seed with a seed characteristic (e.g., first seed-related characteristic or second seed-related characteristic) that is not suitable for planting to the rejected seed outlet 94 or the container 52. A controller 22, alone or together with the synchronization module 31 and valve control module, is configured to control the tertiary bypass valve to direct evaluated seed with a seed characteristic (e.g., first seed-related characteristic or second seed-related characteristic) that is suitable for discarding in the field to the rejected seed outlet 94. A controller 22, alone or together with the synchronization module 31 and valve control module, is configured to control the tertiary bypass valve to direct evaluated seed with a seed characteristic (e.g., first seed-related characteristic or second seed-related characteristic) that is not suitable for discarding in the field to the container 52.

A controller 22, alone or in conjunction with a synchronization module 31 or treatment control module (in the data storage device 30), is configured to control the seed treatment device 36 (e.g., sprayer) to spray, treat, apply, distribute, or dispense a seed treatment that corresponds to one or more characteristics (e.g., first seed-related characteristic, second seed-related characteristic) or both estimated by the evaluators. For example, the controller 22 may be configured to treat timely or spray timely particular seeds 68 within a treatment zone that were previously identified as requiring treatment, by one or more wireless sensor arrangements associated with the corresponding evaluation channel 95, the primary evaluator 32, and the secondary evaluator 34. Further, to treat or spray timely (e.g., in real time) within a target treatment zone that aligns temporally (e.g., simultaneously or synchronously) with the discharge of the previously identified seeds 68 from a discharge port 80 of a row unit and that aligns spatially upon landing of the previously identified seed in a landing zone or in seed planting zone in a seedbed 51 or furrow, the controller 22 takes into account one or more of the following time periods: (1) the transit time period from a particular seed from the evaluation channel 95 to the seed reaching discharge port 80 of the row unit (e.g., which may depend upon the conveyer 12 speed or velocity, which may be adjusted based on vehicle speed for accurate seed spacing and placement in any row, seedbed 51 or furrow); (2) temporary acceleration, burst or increase in rotational velocity, or compensation by the conveyer 12, or its rotors, of a particular seed following one or more rejected seeds 268 to avoid: (a) skips in a series of planted particular seeds 68 (e.g., because of one or more rejected seed 268), (b) discontinuity in seed planting density (e.g., because of one or more rejected seeds 268), or (c) variation in the separation or distance between adjacent seeds 68 in the furrow or seedbed 51; (3) the aggregate or cumulative data processing time period of the wireless arrangement, one or more evaluators, and the controller 22, (4) treatment controller 22 data processing delay, (5) treatment system hydraulic and fluidic lag to delivery of the treatment to the treatment zone, and (6) motion data (e.g., velocity, acceleration, heading or yaw angle, and position versus time) of the corresponding row unit, planter or associated vehicle moving the row unit or planter.

In one configuration, the electromagnetic signal 92 of the wireless arrangement comprises one or more of the following signals: infrared, near-infrared, ultraviolet, microwave, optical, X-ray, ultrasonic and thermal.

In one embodiment, the seed treatment comprises one or more of the following crop inputs: fertilizer, nutrient, minerals, calcium, insecticide, pesticide, herbicide, fungicide, miticide, inoculation, water, insect-targeting bacteria, and insect-targeting virus.

The system of FIG. 2 is similar to the system of FIG. 1, except the system of FIG. 2 repositions the first source 16 and the first receiver 18, which are associated with an evaluation channel 95, after the seed meter 10 or within the conveyer 12. Like reference numbers in FIG. 1 and FIG. 2 indicate like elements or features. The first source 16 and the first receiver 18 comprise a wireless sensor arrangement, as illustrated in FIG. 2. In FIG. 2 the first source 16 and the first receiver 18 are associated with, integral with or mounted on the upstream evaluation dielectric window 56, whereas in FIG. 3 the first source 16, the first receiver 18 are associated with, integral with or mounted on the downstream evaluation dielectric window 56.

Further in the system of FIG. 2, the primary bypass valve 50, the secondary bypass valve 64 and the container 52 of FIG. 1 are replaced by a bypass valve, a container 52 and a pneumatic device 72 with a nozzle 70 (e.g., switchable, pressurized nozzle 70) that produces an air jet 74 or air flow on demand.

The air jet 74 or switchable air nozzle 70 is aligned with or positioned at the seed discharge port 80 of the conveyer 12 and prior to the discharge port 80 of the row unit, such that any particular seed or set of seeds 68 can be rejected as a rejected seed 268, rather than planted as a planted seed. The electronic data processor 24 or the bypass control module may control the bypass valve to divert, route or direct the rejected seed 268 to a seed container 52 or a rejected seed outlet 94, depending on the position of the valve, valve state or valve position. The rejected seed outlet 94 is generally configured to drop the seed on the ground, although a second removable container 52 (e.g., seed collector) could be coupled to the rejected seed outlet 94 in an alternate configuration.

As illustrated in FIG. 2, the conveyer 12 comprises an optional second source 116 and an optional second receiver 118 associated with an evaluation channel 95 (e.g., downstream evaluation channel 295) after the seed meter 10 or within the conveyer 12. The second source 116 and the second receiver 118 are illustrated in dashed lines to indicate their optional nature or optional character. As illustrated in FIG. 2, the optional second source 116 and optional second receiver 118 may be positioned after the seed meter 10 or within the conveyer 12. The combination of the first source 16, second source 116, first receiver 18 and the second receiver 118 may allow multiple spectral electromagnetic bands of wireless sensors to be used to complement or supplement each other to support the accurate identification of first seed-related characteristics, second seed-related characteristics, or both.

The system of FIG. 3 is similar to the system of FIG. 1, except the system of FIG. 3 comprise a first signal sensor arrangement and a second signal sensor arrangement, where the first signal sensor arrangement is associated with the upstream evaluation channel 195 prior to the seed meter 10 and where the second signal sensor arrangement is associated with the downstream evaluation channel 295 after the seed meter 10. Each first signal sensor arrangement and second signal sensor arrangement comprises a first source 16 and first receiver 18 for sensing an electromagnetic signal 92, such as microwave, radio wave, infra-red signal, near infra-red signal, ultraviolet or humanly visible light.

In an alternate embodiment or optionally, each first signal sensor arrangement and second signal sensor arrangement comprises a first source 16, first receiver 18, an optional second source 116 and optional second receive for sensing an electromagnetic signal 92, such as microwave, radio wave, infra-red signal, near infra-red signal, ultraviolet, optical frequencies, humanly visible light. The optional second source 116 and second receiver 118 may be redundant or duplicative with respect to the first source 16 and first sensor to repeat similar additional measurements or additional observations made by the first receiver 18 at the second receiver 118. For example, the electronic data processor 24 may take an average, weighted average, mean, mode, median or other statistical representations of the combined measurements and observations of the first receiver 18 and optional second receiver 118. Alternately, the second receiver 118 may comprise a seed counter, such as a photo-detector, photo-cell, or photo-voltaic cell for measuring a quantity, count or number of seeds 68 passing through a dielectric opening or dielectric window 56 in the respective evaluation channel 95.

Further in the system of FIG. 3, the primary bypass valve 50, the secondary bypass valve 64 and the container 52 of FIG. 1 are supplemented by a tertiary bypass valve, a dual-inlet container 52 (or two separate containers 52) and a pneumatic device 72 with a switchable, pressurized air nozzle 70 that can produce an air jet 74 or concentrated air flow sufficient to move or mobilized a rejected seed 268 toward a rejected seed 268 path or channel 29. The air jet 74 or switchable air nozzle 70 is aligned with or positioned at the seed discharge port 80 of the conveyer 12 and prior to the discharge port 80 of the row unit, such that any particular seed or set of metered seeds 168 can be rejected as rejected seeds 268, rather than planted as planted seeds 68. The electronic data processor 24 or the tertiary bypass control module may control the bypass valve to divert, route or direct the rejected seed 268 to a container 52 (e.g., dual-inlet container 52) or placed on the ground, depending on the position of the valve, valve state or valve position. Further, the secondary bypass valve 64 may be controlled to divert or direct rejected seeds 268 into the dual-inlet container 52 or in two separate containers 52, such as where rejected seeds 268 are rejected or sorted for a two corresponding different purposes.

Figure 4:
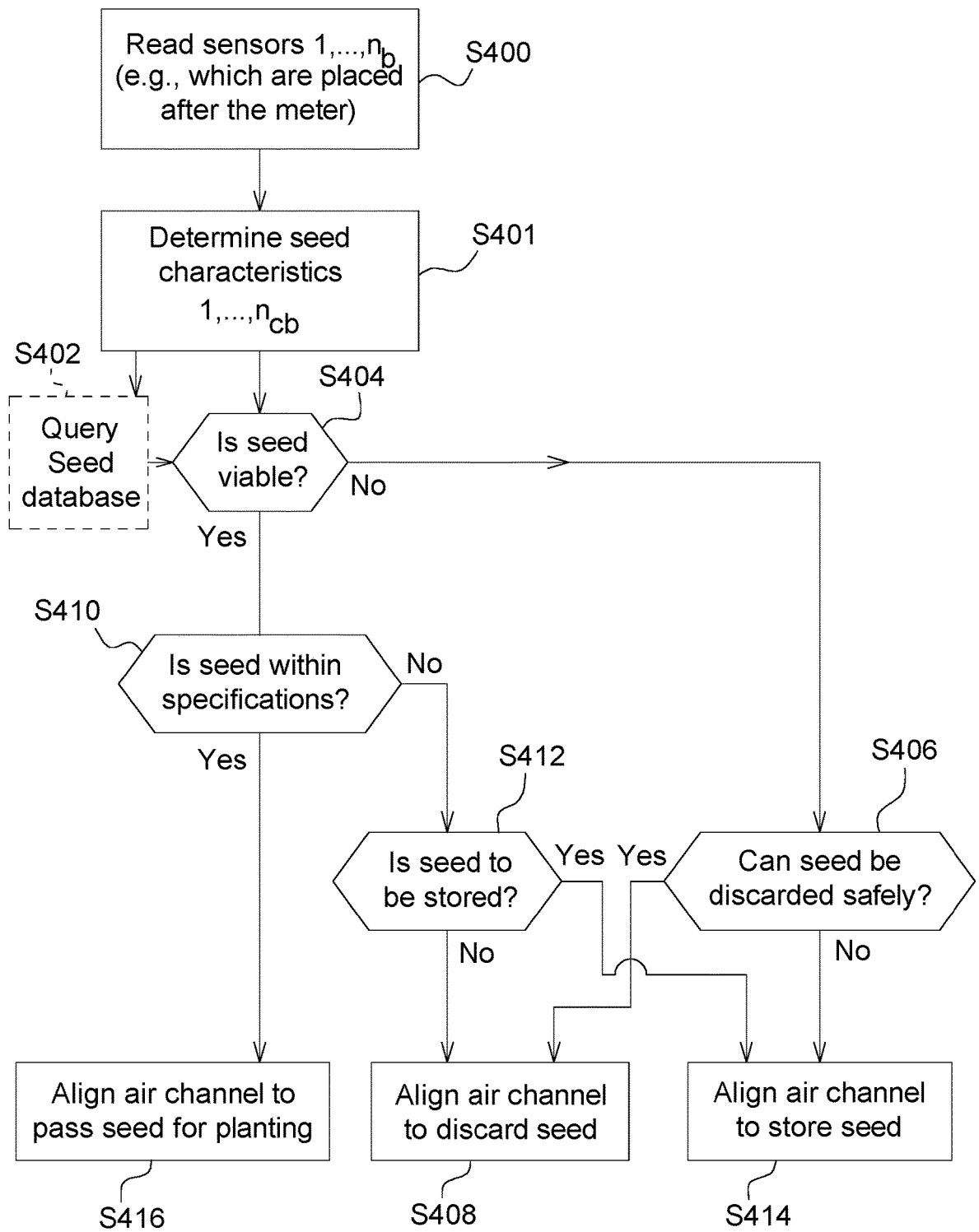
FIG. 4 is a flow chart of a first embodiment of a method for detecting viability of a seed.

FIG. 4 is a flow chart of a first embodiment of a method for detecting viability of a seed. The method of FIG. 4 begins in step S400.

In step S400, the electronic data processor 24 or evaluator (e.g., primary evaluator 32, secondary evaluator 34) reads sensors (e.g., sensors 1 through $n_b$) of a signal sensor arrangement associated with an upstream evaluation channel 195 (prior to the seed meter 10 or the row unit) and/or a downstream evaluation channel 295 (after the seed meter 10). The number of sensors used, evaluated or read in step S400 may comprise any number of sensors from n equals one to n equals $n_b$, where n may have any positive integer or whole number value and $n_b$ is the maximum number of sensors used, evaluated or read and where $n_b$ is any positive integer of two or greater.

In the signal sensor arrangement, the sensors, which are read in step S400, may comprise the first receiver 18 and the optional second receiver 118. For example, the electronic data processor 24 or evaluator (e.g., primary evaluator 32, secondary evaluator 34) reads sensors, detectors or receivers (e.g., positioned or mounted after the seed meter 10) that may comprise sensors, detectors, or receivers 1 through $n_b$, where $n_b$ is any positive integer equal to two or greater.

In one embodiment, the signal sensor arrangement may comprise a first source 16 (e.g., first transmitter) and a respective first receiver 18; the sensors may comprise a second source 116 (e.g., second transmitter) and a respective second reference can receive a transmitted, attenuated or reflected signal component from the second source 116, the first source 16 or both. Similarly, the first receiver 18 can receive a transmitted, attenuated, or reflected signal component from the first source 16, the second source 116 or both. The first source 16 and the second source 116 may transmit electromagnetic signals 92 on the same frequency, different frequencies, in a frequency division multiplex (FDM) configuration, in a time division multiplex (TDM) configuration, a spread spectrum configuration, code division multiple access (CDMA), or with other signal modulation or encoding schemes. As previously referenced, the signal sensor arrangement and its sensor may use electromagnetic radiation or signals within the following frequency ranges, wavelength ranges or bands: visible light, ultraviolet light, and infra-red frequencies, radio frequencies, microwave frequencies and X-ray band. The sensors may collect observations, observed phase, or observed signal magnitude that are facilitate or support spectroscopy, reflectance and absorption to evaluate seed viability, and seed characteristics.

In general, the sensors or signal sensor arrangement are positioned in an evaluation channel 95 to measure an observed phase or an observed attenuation of a pulse or test signal associated with observed particular seed within the evaluation channel 95, as the seed (e.g., pre-metered seed 168 or metered seed 168) is routed to the row unit for planting or other disposition. Although sensors can be placed after the seed meter 10 to evaluate metered seed 168 to execute step S400, in alternate embodiments the evaluation channel 95 can be located prior to the seed meter 10 (e.g., to evaluate pre-metered seed 168), within the seed meter 10, or after the seed meter 10.

In step S401, the electronic data processor 24 or evaluator determines seed characteristics, such as a first seed-related characteristic and/or a second seed-related characteristic, of observed particular seed within an evaluation channel 95 during a sampling time interval; in some configurations, the data processor 24 or evaluator determines seed characteristics 1 through $n_{cb}$, where $n_{cb}$ is any integer equal to or greater to one (e.g., where $n_{cb}$ may be proportional to $n_b$). For example, the electronic data processor 24 or evaluator determines seed characteristics, such as a first seed-related characteristic and/or a second seed-related characteristic, of observed particular seed within an evaluation channel 95 during a sampling time interval based on any of the following: (a) an observed phase of a pulse or test signal associated with observed particular seed within the evaluation channel 95, (b) an observed attenuation of a pulse or test signal associated with observed particular seed within the evaluation channel 95, (c) a reference phase of a pulse or test signal associated with observed particular seed within the evaluation channel 95 (e.g., for a corresponding reference seed type, species or variety), (d) a reference attenuation of a pulse or test signal associated with observed particular seed within the evaluation channel 95 (e.g., for a corresponding reference seed type, species or variety), (e) estimating a seed characteristic based on searching for candidate seed (e.g., via least squares error minimization process, Kalman filter or otherwise) characteristics that minimize a difference between observed phase data and reference phase data 35, (f) estimating a seed characteristic based on searching for candidate seed characteristics (e.g., via least squares error minimization process, Kalman filter or otherwise) that minimize a different between observed attenuation data and reference attenuation data 37, and (g) entry or input of seed parameters via a user interface or optical reader/scanner of an electronic data processing system comprising the electronic data processor 24.

In optional step S402, which is indicated in dashed lines, the data processor 24 or evaluator may query the seed data base: (a) to facilitate determination in step S404 of whether the seed is viable, and/or (b) to facilitate determination of seed characteristics in step S401 based on the read or observed phase and observed attenuation of electromagnetic signals 92 in the evaluation channels 95 of step S400. Further, to determine seed characteristics, in step S401, alone or in combination with step S402, the data processor 24 or evaluator references, searches, retrieves, reads or accesses reference data stored in the data storage device 30 or on a remote server, the cloud or elsewhere, where the reference data may be associated with a respective reference seeds 68 with known seed specifications or known parameters. The reference data may comprise any of the following: reference phase data 35, reference attenuation data 37, and corresponding seed characteristic data 76, and seed specifications, such as seed viability standards, requirements or specifications and specifications for corresponding seed states, or seed characteristics. The reference data or seed database may comprise reference phase data 35 and corresponding seed characteristic data 76 for one or more frequency bands of an electromagnetic signal 92, reference attenuation data 37 and corresponding seed characteristic data 76 for one or more frequency bands of an electromagnetic signal 92; or a combination or permutation of reference phase data 35 and reference attenuation data 37 associated with corresponding seed characteristic data 76 for one or more frequency bands of an electromagnetic signal 92.

For example, the data storage device 30, server or cloud may store primary reference phase data 35 and associated primary reference attenuation data 37 associated with a first seed-related characteristic data for one or more frequency bands of an electromagnetic signal 92; the data storage device 30 may store secondary reference phase data 35 and associated secondary reference attenuation data 37 associated with second seed-related characteristic data for one or more frequency bands of an electromagnetic signal 92. The observed phase data and observed attenuation data is compared, searched or matched (e.g., via a least squares error minimization search process or Kalman filter approach) to the reference phase data 35 and reference attenuation data 37 to determine the seed characteristics, such as the first seed-related characteristic and the second seed-related characteristic that minimizes a difference between the observed data and reference data.

In conjunction with steps S401, S402 or both, the electronic data processor 24 may have a user interface that supports input, selection or entry of a seed type, species, variety, coating, treatment or other reference parameters into the seed database or reference data for storage or updating the reference data from time to time. The user interface may be coupled to the data port. Alternately or cumulatively with the above input to the user interface, a reader, such as an optical code scanner or bar code scanner may be coupled to the data port and a user may scan or read labels of seed prior to loading the seed in one or more row units of a planter to update the reference data. Alternately or cumulative with the above input to the user interface, a wireless communications device, such as a satellite transceiver, cellular transceiver, cellular phone, or otherwise may receive updates of the reference data or seed database from a service provider or the service provider may provide analysis, evaluation or processing of the phase observations, the attenuation observations, or both at one or more corresponding frequencies to do the processing in step S402, alone or in combination with steps S401, S404 and S410, as a software as a service (SaaS) that is communicated wirelessly to a vehicle, or its implement (e.g., planter or row unit) at the filed or work site.

In step S404, the electronic data processor 24 determines whether or not the seed is viable based upon the determined seed characteristics; in step S402 the data processor 24 or evaluator queries the seed data base to facilitate, supplement or augment the determination whether the seed is viable based upon a potential evaluation of reference data (e.g., seed database) stored in the data storage device 30 to supplement or augment the seed viability determination of step S404. For example, collectively in steps S402 and S404, the electronic data processor 24 or evaluator (e.g., primary evaluator 32, secondary evaluator 34) may evaluate or determine seed viability based on the first-seed related characteristic, the second seed-related characteristic, and a corresponding viability parameter in the reference data or seed database stored within the data storage device 30.

Step S404, alone or in combination with step S402, may be executed in accordance with the following techniques, which may be applied or executes separately or cumulatively.

Under a first technique, the wireless sensor arrangement (e.g., first source 16 and first receiver 18, collectively) comprises a source that transmits X-ray frequency radiation and a receiver the receives X-ray observations, such as attenuated, phase-shifted, reflected electromagnetic signals 92 from the transmitted X-ray frequency radiation to indicate whether the seed is viable. The electronic data processor 24 or evaluator evaluates the X-ray observations to determine whether the seed embryo within a seed is normal (e.g., viable) or abnormal (e.g., non-viable), where this evaluation can be applied to certain types of beans or legumes; possibly other seeds 68.

Under a second technique, the electronic data processor 24 or evaluator evaluates the X-ray observations can reveal pests/parasites such as granary weevil in grains, such as corn or maize, that can determine viability. For example, in real time as the seed traverses or progressed through the planter or row unit, the electronic data processor 24 or evaluator evaluates the X-ray observations to reveal pests/parasites such as granary weevil in grains, such as corn or maize. If the data processor 24 or evaluator detects evidence of the pest/parasite in or on particular seeds 68 (e.g., seed damage, misshaped seeds 68, seed boring, seed tunnels or seed chewing indicators or presence/identification of the parasite) or in a minimum percentage of scanned seeds 68 over a sampling internal, the particular seeds 68 can be regarded as not viable. Further, as discussed elsewhere in this document, rather than discard, eject, or drop infested seeds 68, parasite-infested seeds 68, or infected nonviable seeds 68 onto field, the pneumatic device 72 or vacuum system is configured to collect the pest-ridden nonviable seeds 68 that detected and ejected by timely activation of an air jet 74. Similarly, the infected/bad, nonviable seeds 68 that do not meet some quality level might be saved to present to the seed distributor or seed provider to ask for a replacement, exchange, refund, or offset, for example.

Under a third technique, the electronic data processor 24 or evaluator evaluates the observed phase, the observed attenuation or both at one or more frequency bands of the sensors to detect, identify or characterize abnormal seed properties or seed characteristics that indicate nonviability, such as any of low probability of germination below a threshold minimum germination (e.g., requirement in the seed data base), including but not limited to any of the following determined seed characteristics: (a) seed size outside of normal range of seed size (e.g., per seed specifications in seed data base in data storage device 30, in cloud, on server or online); (b) seed structural defects, such as cracked seeds 68 or fragmented seeds 68 (e.g., via radio frequency observations of the sensors); (c) presence of material mold or fungus (e.g., in optical images or humanly visible light observations, or via radio frequency observations of the sensor); (d) identification or differentiation of debris (e.g. pebble, plastic, metal or other non-seed contaminants) from seed (e.g., in optical images or humanly visible light observations, or radio frequency observations of the sensors).

Under a fourth technique, the electronic data processor 24 or evaluator evaluates the observed phase, the observed attenuation or both at one or more radio frequency bands of the sensors to detect, identify or characterize abnormal seed properties or seed characteristics that indicate viability or nonviability, such as: (1) seed size detection with compensation for rotation of the seeds 68 in the evaluation channel 95, (2) seed structural defects, such as cracked seeds 68 or fragmented seeds 68, and (3) detection of debris, mold or fungal damage, Further in some applications, the radio frequency sensors and evaluation is well suited for real time (or near real time) implementation for planting and harvesting operations to determine appropriate remedial, corrective actions or monitoring seed quality.

Under a fifth technique, the electronic data processor 24 or evaluator evaluates the observed phase, observed reflectance, the observed attenuation (e.g., absorption), or any combination of the above observations, at one or more radio frequency bands of the sensors, such as X-rays, visible and infra-red frequencies, to evaluate seed viability and/or variety. Accordingly the sensors or set of sensors can be arranged or configured in series along the path of travel in conjunction with the evaluation channel 95.

If the electronic data processor 24 or evaluator determines that the seed is viable, the method continues with step S410. In step S404, for example, the electronic data processor 24 or evaluator (e.g., primary evaluator 32, secondary evaluator 34) determines whether the observed particular seed is viable based on the first seed-related characteristic and a second seed-related characteristic. However, if the data processor 24 or evaluator determines that the seed is not viable, the method continues with step S406.

In step S410, the electronic data processor 24 determines whether the seed is within target specifications based on the determined first seed-related characteristic, the determined second seed-related characteristic, or both for a particular seed that is aligned with the evaluation channel 95. If the electronic data processor 24 determines that the seed is within target specifications, the method continues with step S416. However, if the electronic data processor 24 determines that the seed is not within, or is outside, target specifications, the method continues with step S412.

Compliance with the target specifications in step S410 is typically a greater requirement or higher standard than meeting a minimum threshold of seed viability in step S404. If the particular seed does not meet the target specifications, the particular seed may germinate and be viable (or conditionally viable based on proper application of crop input or treatment to the particular seed or seedbed 51, such as by the treatment device), but the plant may not be as vigorous as a normal plant to produce a target crop yield equal to or greater than a normal plant, for instance. Target specifications may comprise the first seed related characteristic, the second seed related characteristic indicates, or both that indicates whether or not the particular seed has or is in: (a) a diseased state, (b) a detrimental health state, (c) a detrimental diagnosis or prognosis, such as a material virus, bacteria, mold, fungus, pest, infestation, insect contamination (e.g., larvae, eggs, worms, or mature insects), (d) disease-related coloration, or (d) disease-related deformity.

Step S410 may be executed in accordance with various examples that may be executed separately or cumulatively.

Under a first example, for the particular seed sampled in the evaluation channel 95 during a sampling interval, the data processor 24 or evaluator determines if the determined first seed-related characteristic, the determined second seed related characteristic, or both indicate that the particular seed meets the target seed specifications or requisite seed specifications (e.g., in the data base), such as absence of or non-detection of any material defect that tends to decrease crop performance or yield associated with the particular seed. Further, in the target specifications (e.g., associated with the seed database or reference data), the material defect may comprise on or more of the following detected conditions of the particular seed that tends to decrease crop yield associated with the particular seed: a diseased state; a detrimental health state; a detrimental diagnosis or prognosis, such as material virus, bacteria, mold, fungus, pest, infestation; on-going or active insect contamination (e.g., larvae, eggs, worms, or mature insects); disease-related coloration, or disease-related deformity. For example, in step S410 if the first seed-related characteristic or second seed-related characteristic indicates that the seed is in a diseased state, a detrimental health state, a detrimental diagnosis or prognosis, in step S412 the method may route or direct seeds 68 to a storage device for safe disposal in step S414, rather than putting or discarding the seeds 68 on a field during a growing season.

Under a second example, for the particular seed sampled in the evaluation channel 95 during a sampling interval, the data processor 24 or evaluator determines if the determined first seed-related characteristic, the determined second seed related characteristic, or both indicate that the particular seed meets the target seed specifications or requisite seed specifications (e.g., in the data base). In particular, the particular seed that meets the target seed specifications does not have any detected material defect or is not in a diseased state, a detrimental health state, a detrimental diagnosis or prognosis, such that the particular seed for the sampling interval can be planted in the seedbed 51 by the row unit in step S416 (e.g., without any estimated or predicted material reduction in crop yield).

Under a third example, for the particular seed sampled in the evaluation channel 95 during a sampling interval, the data processor 24 or evaluator determines if the determined first seed-related characteristic, the determined second seed-related characteristic, or both indicate that the particular seed does not meet the target seed specifications or requisite seed specifications because the first seed-related characteristic or the second seed related characteristic indicates that the seed is cracked, split, fragmented, partial, or physically damaged other than a diseased state, a detrimental health state, a detrimental diagnosis and detrimental prognosis. For example, particular seeds 68 associated with the respective first seed related characteristic or the second seed related characteristic can be discarded safely on the ground (e.g., of the field or work area without material risk of contamination of seeds 68, seedlings or plants associated with the operation of the row unit) to the extent that: (a) first seed related characteristic or the second seed related characteristic indicates that the seed is cracked, split, fragmented, partial, or physically damaged other than a diseased state, a detrimental health state, a detrimental diagnosis and detrimental prognosis, and/or (b) the first seed-related characteristic or the second seed-related characteristic indicates that the seed does not have or is not in a diseased state, a detrimental health state, a detrimental diagnosis or prognosis.

Under a fourth example, for the particular seed sampled in the evaluation channel 95 during a sampling interval, the data processor 24 or evaluator determines if the first seed-related characteristic, the second seed-related characteristic, or both indicate that the particular seed, in the in a diseased state, a detrimental health state, a detrimental diagnosis or prognosis, can be cured by a treatment process on the row planting unit, by application of a crop input to the seed, seedbed 51, ground, furrow, and/or trench. For example, the treatment process may comprise spraying the seed, seedling, or plant with a treatment or crop input, after the particular seed has been planted (or during the planting of the particular seed) in the seedbed 51, or placed in a furrow, trench or opening in the soil. As used herein, the crop input or treatment may comprise a fertilizer, nutrients (e.g., nitrogen, potassium, or phosphorus), minerals, pesticide, a fungicide, an insecticide, a herbicide, miticide, irradiation, sterilization, steaming, or other suitable treatment.

Under a fifth example, for the particular seed sampled in the evaluation channel 95 during a sampling interval, the data processor 24 or evaluator determines if the first seed-related characteristic, the second seed-related characteristic, or both indicate that the particular seed, the first seed-related characteristic, the second seed-related characteristic (e.g., sorting characteristic), or both indicates that the seed, has or satisfies a first targeted variety, hybrid, crop identifier, species, size, coloration, shape, grade or type or does not satisfy a second targeted variety, hybrid, crop identifier, species size, coloration, shape, grade or type. For example, the first seed-related characteristic and the second seed-related characteristic may indicate the identification of primary target seeds 68 (e.g., first seed species or first plant species) for sorting or segregation from secondary target seeds 68, where the primary target seeds 68 can be planting by a row unit and wherein the second target seeds 68 (e.g., second seed specifies or second plant species) can be diverted or stored in a container 52 for subsequent planting or saving for planting in another zone, geographic area or field.

In the fifth example, the first seed-related characteristics and the second seed-related characteristics, collectively, may relate to multispectral imaging (visible and infrared reflectance) of the sensors or wireless arrangement associates with the evaluation channel 95. In particular, multispectral sensors may allow different species or types (e.g., corn or maize versus soybeans) of seed to be distinguished. For example, species discrimination might be applied to corn, grain, maize, oilseeds 68 or soybeans. Seed species that are mixed from the seed company (for from a seed saving farmer) could be sorted and collected by a row unit (e.g., in the container 52) or other collection mechanism and then planted in a different field location.

Further in one configuration, the primary target seeds 68 comprise a first variety of a crop (e.g., corn or maize with first genetic characteristics), whereas the second target seeds 68 comprise a second variety of the crop (e.g., corn or maize with second genetic characteristics). In another configuration, the primary target seeds 68 comprise a first species of a crop (e.g., corn or maize with first genetic characteristics), whereas the second target seeds 68 comprise a second species of crop (e.g., legumes, beans or peas with second genetic characteristics). In yet another configuration, the primary target seeds 68 comprise a first species, variety or type of a crop (e.g., first grain, such as wheat), whereas the second target seeds 68 comprise a second species, variety of type of crop (e.g., second grain, such as oats or barley).

In the fifth example, the target specifications relate to crop yield because if the wrong crop is planted in the field, the yield of the target crop generally is reduced for the field. However, it is possible that some target specifications, such as variety selection or other parameters may not relate to crop yield or may have lower correlations to crop yield than other target specifications.

In one configuration, step S406 may be executed following step S404. In step S406, the electronic data processor 24 determines if or whether the seed can be discarded safely by depositing on the ground in the field or work area. If the data processor 24 determines that the seed can be discarded safely, then the method continues with step S408. However, if the data processor 24 determines that the seed cannot be discarded safely, then the method continues with S414.

In step S414, the electronic data processor 24 or controller 22, bypass valve control module 78, pneumatic device 72 control module, or combination of the foregoing devices, aligns the air channel 29 or controls one or more bypass valve actuators 49, and pneumatic devices 72 to direct, or route particular seeds 68 to a seed storage container 52 (e.g., for the row unit). In step S414, seeds 68 that are determined not be planted may be collected in a container 52 or in another seed collecting apparatus. The collection of seeds 68 may be due to separation of diseased seed, insect activity, or incorrect seed variety or species for planting. Multiple seed containers 52 or seed collectors, along with corresponding controllable bypass valves by appropriate logic of the data processor 24, are feasible as well to further categorize the seeds 68 stored. The storing of seed can be used to prove seed quality to the seed company and acquire a refund or use the seed for other parts of the field if it is viable.

In step S412, the electronic data processor 24 determines whether or not the seed is to be stored if the seed is not within target specifications. If the seed is to be stored, the method continues with step S414. However, if the seed is not to be stored, the method continues with step S408.

In step S408, the electronic data processor 24 aligns, controller 22, or bypass valve control module 78 aligns or activates one or more the bypass valve actuators 49 or the air channel 29 to discard the seed. For example, the electronic data processor 24, controller 22, or bypass valve control module 78, pneumatic device 72 control module, or combination of the foregoing devices, aligns or controls the primary bypass valve 50 to direct or divert seeds 68 away from seed meter 10 for metering and aligns or controls secondary bypass valve 64 to direct or divert rejected seeds 268 to the ground (for disposal). In step S408, rejected seeds 268 that are discarded may comprise cracked or otherwise compromised seeds 68 (e.g., fungus, rot, mold) that are rejected in real-time to prevent planting the seed. Accordingly, detected low quality seed is separated from the higher quality seed; can be provided to the operator of the vehicle in real time on or via the user interface.

In step S416, the electronic data processor 24 or controller 22, bypass valve control module 78, pneumatic device 72 control module, or combination of the foregoing devices, aligns or controls the bypass valve or air channel 29 to pass the seed to the seed meter 10. For example, the electronic data processor 24 aligns or controls the primary bypass valve 50 to direct seeds 68 to the seed meter 10 for metering; possible planting by the row unit. Consistent with the above method of FIG. 4, the detection of seed quality in real time is well-suited for avoiding the planting of damaged seed, the separation of damaged seed during harvesting, and providing farm analytics to understand field treatment plans, and agronomic decision making. Accordingly, the discarding or collection of damaged or lower quality seeds 68 tends to promote uniform germination, consistent plant emergence, and higher yield.

Figure 5:
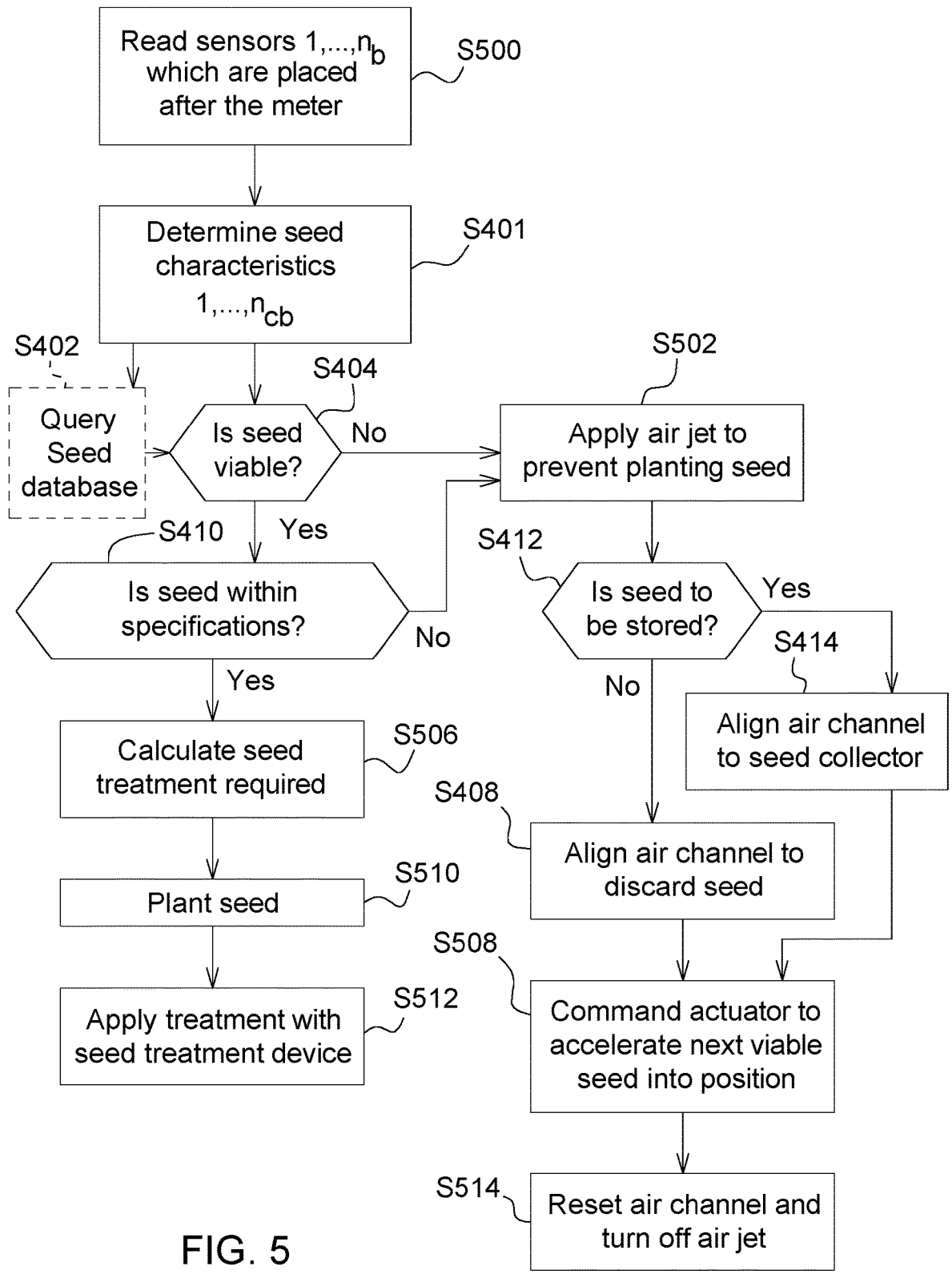
FIG. 5 is a flow chart of a second embodiment of a method for detecting viability of a seed.

FIG. 5 is a flow chart of a second embodiment of a method for detecting viability of a seed. The method of FIG. 5 is similar to the method of FIG. 4, except the method of FIG. 5 includes additional steps S506, S510, S512, S502, and S508. Like reference numbers in FIG. 4 and FIG. 5 indicate like steps, procedures or elements.

In FIG. 5, step S410 determines whether the seed is within the seed specifications. If the seed is within the seed specifications or seed planting specifications, the method continues with step S506. However, if the seed is not within the seed specifications or seed planting specifications, the method continues with step S502.

In step S410, the seed specifications of FIG. 4 and FIG. 5 may be the same or similar. For example, the seed specifications may refer to compliance with specifications, such as first seed related characteristics, second seed related characteristics, or both, that are indicative that the seeds 68 are suitable for planting. If the data processor 24 or evaluator determines that the seeds 68 are within specifications, the method continues with step S506. However, if the data processor 24 or evaluator determines that the seeds 68 are not within specifications, the method continues with step S502.

In step S506, the data processor 24 or seed treatment module determines or calculates the seed treatment required. The seed treatment may be specific to the particular seed that is targeted or scheduled to be planted. The seed data base may store seed identifiers and corresponding seed treatments in the data storage device 30, online, in a server or in the cloud (e.g., distributed network accessible via the Internet). In some configurations, seed treatments may be customized or configured specifically to planting seeds 68 in a particular region, at a particular seasonal time, for certain temperature conditions, in certain climatic zones, for certain soil temperatures, soil types or soil moisture content. In one example, seed treatments may be configured to restore coatings on seeds 68 on particular seeds 68 that have been damaged. In another example, seed treatments may be configured to support planting in damp or cold ground, such as fungicide. In another example, prophylactic seed treatments of pesticides, nutrients, fungicides, insecticides or other crop inputs may facilitate improved germination, plant growth and crop yields.

In step S510, the electronic data processor 24 provides instructions to the seed meter 10 and the row unit to plant seed. For example, the electronic data processor 24 provides instructions to the seed meter 10 and the row unit to plant seed at a particular density or seed spacing in a row that is based on or proportional to the ground speed, velocity, or acceleration of the row unit provided by one more motion sensors 41, such as a satellite navigation receiver, an inertial measurement unit (IMU) or one or more accelerometers.

In step S512, the electronic data processor 24 or the seed treatment module provides data messages or commands to the seed treatment device 36 to treat the particular metered seeds 168, discharged seeds 368, or planted seeds 468 that exit the row unit at a discharge port 80. For example, the electronic data processor 24 or the seed treatment module provides data messages or commands to the seed treatment device 36 to treat the particular metered seeds 168, discharged seeds 368, or planted seeds 68 in the furrow or seedbed 51 that previously exited the row unit at a discharge port 80.

In step S404, if for a sampling interval, the electronic data processor 24 or the evaluator determines the particular seed within an evaluation channel 95 is not viable, the method continues with step S502. Similarly, in step S410 if the data processor 24 or evaluator determines that the seed is not within the specifications (e.g., in the seed data base or seed reference data), then the method continues with step S502. In step S502, the data processor 24 or the pneumatic control module generates a data message or control signal to apply air jet 74 to prevent seed from being planted.

In step S412, the electronic data processor 24 determines whether or not the seed is to be stored if the seed is not within target specifications. If the seed is to be stored, the method continues with step S414. However, if the seed is not to be stored, the method continues with step S408.

In step S408, the electronic data processor 24 aligns, controller 22, or bypass valve control module 78 aligns or activates one or more the bypass valve actuators 49 or the air channel 29 to discard the seed. For example, the electronic data processor 24, controller 22, or bypass valve control module 78, pneumatic device 72 control module, or combination of the foregoing devices, aligns or controls the primary bypass valve 50 to direct or divert seeds 68 away from seed meter 10 for metering and aligns or controls secondary bypass valve 64 to direct or divert rejected seeds 268 to the ground (for disposal). In step S408, rejected seeds 268 that are discarded may comprise cracked or otherwise compromised seeds 68 (e.g., fungus, rot, mold) that are rejected in real-time to prevent planting the seed. Accordingly, detected low quality seed is separated from the higher quality seed; can be provided to the operator of the vehicle in real time on or via the user interface.

In step S414, the electronic data processor 24 or controller 22, bypass valve control module 78, pneumatic device 72 control module, or combination of the foregoing devices, aligns the air channel 29 or controls one or more bypass valve actuators 49, and pneumatic devices 72 to direct, or route particular seeds 68 to a seed storage container 52 (e.g., for the row unit). In step S414, seeds 68 that are determined not be planted may be collected in a container 52 or in another seed collecting apparatus. The collection of seeds 68 may be due to separation of diseased seed, insect activity, or incorrect seed variety or species for planting. Multiple seed containers 52 or seed collectors, along with corresponding controllable bypass valves by appropriate logic of the data processor 24, are feasible as well to further categorize the seeds 68 stored. The storing of seed can be used to prove seed quality to the seed company and acquire a refund or use the seed for other parts of the field if it is viable.

After step S414 or step S408, the method continues with step S508. In step S508, the data processor 24 or controller 22 the commands one or more actuators 49, such as electric drive motors that drive the conveyer 12 (e.g., brush belt 85) to accelerate such that a next seed following the particular seed, which was rejected, has a proper spacing or seed density with respect to a last seed or previously spaced seed in the row. In practice, the data processor 24 or controller 22 generates a command in real time to activate one or more electric drive motors to accelerate the conveyer 12 to compensate for a seed skip or missing seed that has been rejected and diverted to the ground or to the container 52. If seeds 68 are removed by an air jet 74, there could be a skip in the seeds 68 planted in the row, unless the electronic data processor 24 or controller 22 activates a compensator, such as a temporary, rapid increase or burst in seed planting density. The compensator avoids seed skips by be activated simultaneously with, or within minimal lag after, removal or rejection of rejected seeds 268 from any row unit. The seed delivery motor or brush belt motor can provide very rapid acceleration to advance the next seed to fill the potential skip from the rejected seed 268 (that was previously metered assuming a subsequent seed would not be rejected).

In step S514, the electronic data processor 24, controller 22, and bypass valve control module 78 will reset the air channel 29 and bypass actuators 49 to their respective rest state, inactive or normally-closed position or normally open position, per applicable software instructions or logic. Similarly, the electronic data processor 24, controller 22 and pneumatic control module will reset, deactivate or turn off the air jet 74 by sending a data message or control signal to the pneumatic device 72.

Figure 6:
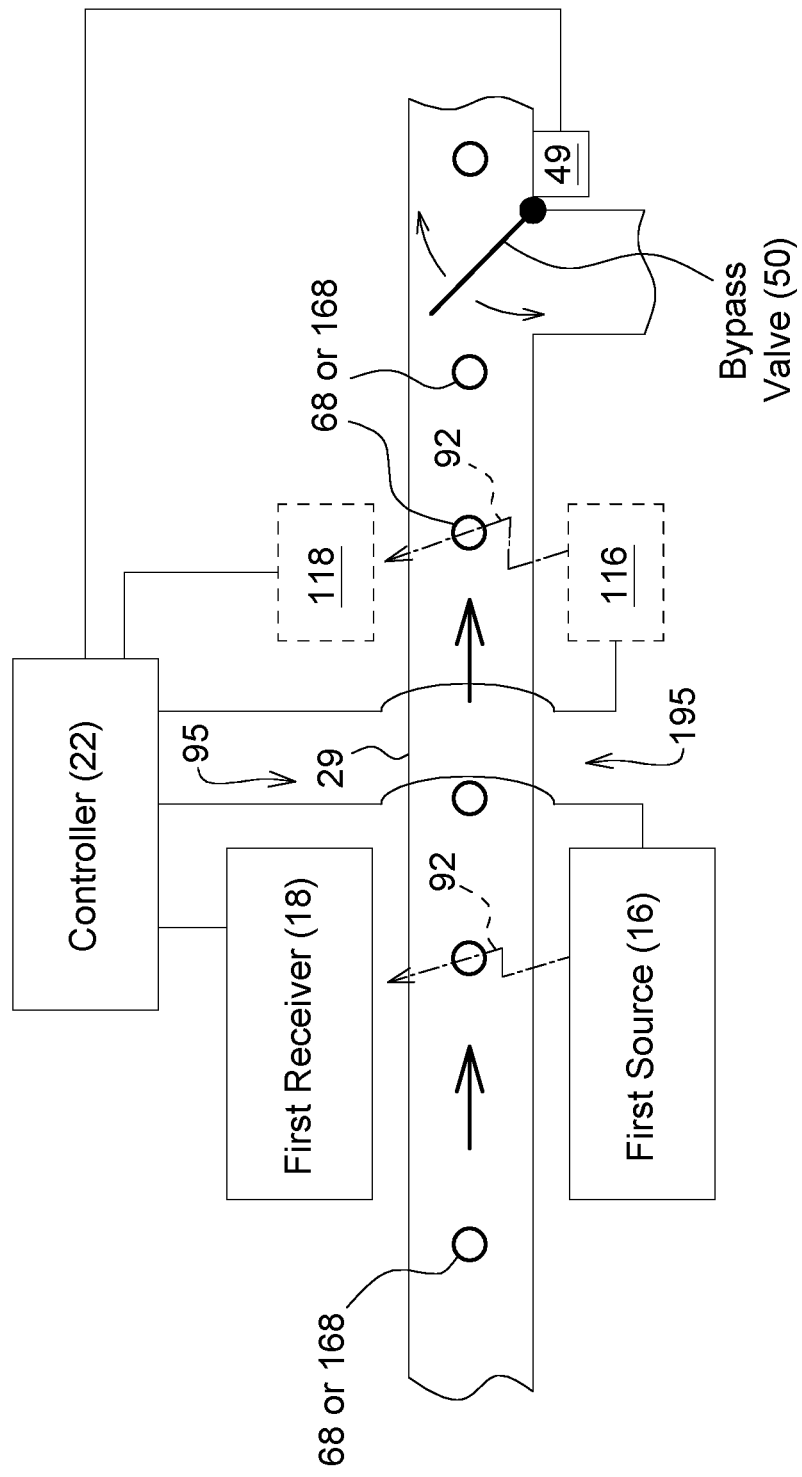
FIG. 6 is a block diagram of an enlarged portion of region 6 of FIG. 1.

FIG. 6 is a block diagram of an enlarged portion of region 6 of FIG. 1. The controller 22 is coupled to the first receiver 18, the first source 16, the optional second receiver 118 and the optional second source 116. The first source 16 and the optional second source 116 may operate on different frequency bands, such as in a multi-spectral arrangement. For example, the first source 16 and first receiver 18 may operate on first frequency band (e.g., near-infrared frequency range), whereas the second source 116 and the second receiver 118 may operate on a second frequency band (e.g., humanly visible light or optical frequencies) that are different the first frequency band to estimate certain seed-related characteristics. As shown in FIG. 6, some components of the electromagnetic signal 92 that are transmitted by the first source 16 and the optional second source 116 travel through a particular seed in the seed evaluation channel 95; hence, the reference phase and reference signal strength of the transmitted electromagnetic signal 92 is perceived as changed or shifted in observed phase and/or attenuated in observed signal strength by the first receiver 18 and/or the second receiver 118.

Figure 7:
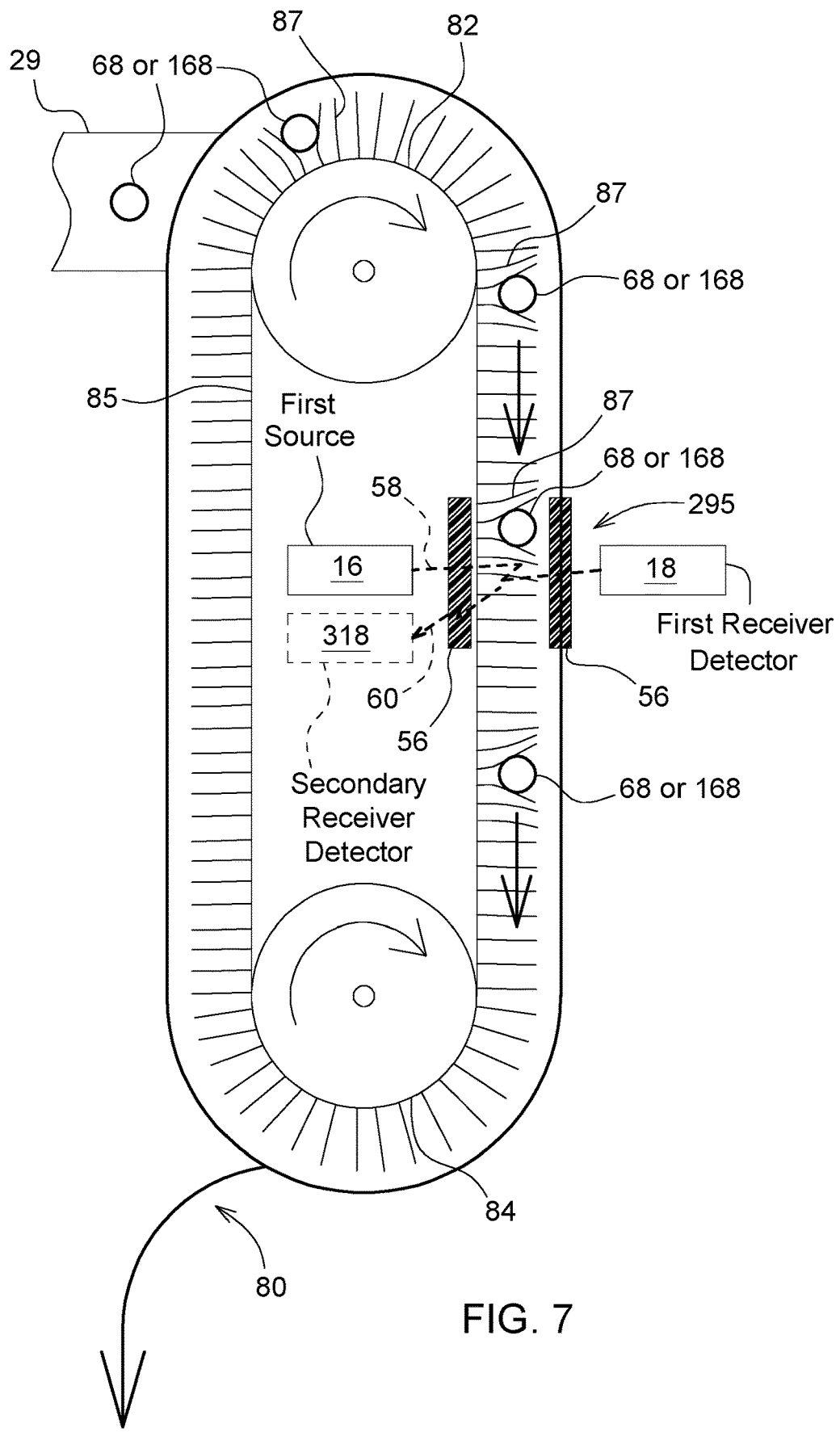
FIG. 7 is a cross-section of a portion of a conveyer of a row unit with an alternate wireless sensor arrangement to FIG. 3.

FIG. 7 is a cross-section of a portion of a conveyer 12 of a row unit with an alternate wireless sensor arrangement to FIG. 3. FIG. 7 illustrates a cross section that shows metered seeds 168 retained in the brush belt 85 with targeted seed separation or offset for planting in the furrow or seedbed 51 based on the vehicle ground speed. The motion sensor 41 can provide the estimated vehicle ground speed for adjustment or compensation of the seed metering or conveyer 12 speed driven by one or more electric drive motors to drive one or both rotors of the conveyer 12.

As illustrated in FIG. 7, the seed evaluation channel 95 features one or more dielectric window 56, where if ultraviolet, infra-red, near infra-red or optical signals are transmitted, received, observed or communicated, the dielectric windows 56 may comprise glass, plastic, or polymer, quartz or other material that is optically transparent or that provides minimal attenuation to the frequency band or wavelength of the electromagnetic signals 92 that are transmitted by the first source 16, the second source 116 or both. Further, in FIG. 7, the first transmitter can be observed or received by one or more receivers, such as the first receiver 18 and a secondary receiver, where the first receiver 18 may receive a direct, attenuated signal and wherein the secondary receiver may receiver a reflection of the transmitted signal or a reflection of the direct, attenuated signal.

FIG. 8 is an alternate embodiment of a system for detecting viability of seed, where the system of FIG. 8 illustrates a cross-section of one possible row planting unit with one configuration of a wireless sensor arrangement. As shown in FIG. 8, one or more sensors are positioned downstream from the seed meter 10 and in the conveyer 12 (e.g., brush belt 85 assembly), which allows less data processing time for seed analysis and evaluation, such as to reject nonviable, defective or contaminated particular seeds 68 in real time.

In FIG. 8, a radio frequency (RF) sensor is positioned in the brush belt 85 delivery system or conveyer 12. The RF sensor, in conjunction with the electronic data processor 24/controller 22, facilitates detection of unviable particular seed. An air jet 74 or pneumatic jet is positioned downstream from the conveyer 12 of the row unit, with respect to seed movement, in the conveyer 12, brush-belt assembly or row unit. In response to the detection of a unviable seed by the RF sensor, in real time as the unviable seed moves through the row unit, the electronic data processor 24 sends a data message or triggering signal to trigger activation of pneumatic device 72 to reject the particular unviable seed. The pneumatic device 72 produces an air jet 74 or burst of air to remove the particular unviable seed (just identified during the sampling interval in the evaluation channel 95) from delivery system (in brush belt 85, conveyor, or gravity tube).

FIG. 9 is another alternate embodiment of a system for detecting viability of seed, where the system of FIG. 9 illustrates a cut-away, cross-section of a seed metering device with another configuration of a wireless sensor arrangement. In FIG. 9 is similar to FIG. 8, except the RF sensor is located within the seed meter 10 of FIG. 9. Outside the seed meter 10, a first source 16 generates or transmits an electromagnetic signal 92 that directed radially inward into the seed meter 10, where the transmitted signal is reflected, attenuated or changed when it is observed or received by the first receiver 18 within the seed meter 10. In the configuration FIG. 9 the air jet 74 or pneumatic jet is positioned downstream, with respect to seed movement, in the brush-belt 85 assembly or row unit in a similar manner to that illustrated in FIG. 8. FIG. 9 also illustrates the gravity path 88 of the flow of seed from the seed hopper 19 or pneumatic supply tube of the row unit into the seed meter 10; the metered seeds 168 in the radial slots 86 of the disc of the seed meter 10 as the disc rotates (e.g., in a clockwise direction as illustrated in FIG. 9).

Although the system for detecting viability of seed is incorporated into a planter or row unit of planter, in alternate configurations the system for detecting viability of seeds may be a stand-alone unit that is separate from the planter or a unit that in integrated with a combine or harvester for sorting seed by variety or quality, such as in real time detect low quality seed to separate from the higher quality seed. Can measure seed quality in real time for data analytics and grain quality separation.

This document describes various illustrative embodiments which can be varied in many ways. Such variations are not to be regarded as a departure from the spirit and scope of illustrative embodiments, and all such variations or The following is claimed:

1. A system for detecting viability of seed, the system comprising:
    a seed meter comprising a rotor with slots that are spaced apart from each other, each slot having a suitable shape and size to receive a corresponding seed, the seed meter having an entrance port for receiving seed into the seed meter and an exit port for seed exiting from the seed meter, where each exiting seed is spaced spatially from any prior seed or later seed exiting the exit port;
    a conveyer, comprising a retaining member, for receiving the seed from the exit port, the conveyer conveying seed exiting the seed meter to a seed discharge port for depositing or planting the seed in a furrow in the ground;
    an evaluation channel section through which a series of particular seeds pass;
    a first source of an electromagnetic signal for illuminating or radiating the evaluation channel section, where the electromagnetic signal comprises a pulse with at a reference phase and reference magnitude;
    a first receiver of the electromagnetic signal, the receiver comprising a detector to measure a seed characteristic based on an observed phase and an observed magnitude;
    an evaluator to evaluate a first difference between the reference phase and the observed phase and a second difference between the reference magnitude and observed magnitude to estimate a characteristic of one or more seeds in the series of particular seeds in the evaluation channel section; and
    a seed treatment device for spraying or treating discharged seed with a seed treatment based on the estimated characteristic of the particular seeds.

2. The system according to claim 1 further comprising:
    a synchronization module estimating a time period or delay associated with the transit a particular seed traveling between the evaluation channel section and discharge port of a row unit;
    the seed treatment device for spraying or treating discharged seed with a seed treatment based on the estimated characteristic and the estimated delay.

3. The system according to claim 2 wherein the synchronization module further estimates a data processing time of an electronic data processor to determine a first seed-related characteristic or a second seed-related characteristic.

4. The system according to claim 1 wherein the evaluation channel section is associated with an upstream evaluation channel that feeds the seed meter with seed.

5. The system according to claim 4 further comprising:
    a rejected seed channel connected to the evaluation seed channel after the first source and the first receiver;
    a seed bypass valve connected to the evaluation seed channel and the rejected seed channel;
    an electromagnetic actuator for controlling a state or position of the seed bypass valve for directing or routing seeds for potential planting via a discharge port or to the rejecting seed channel;
    a controller for controlling the seed bypass valve to direct evaluated seed with a characteristic that is not suitable for planting to the rejected seed channel.

6. The system according to claim 5 further comprising:
    a container for receiving the rejected seeds from the rejected seed channel, the container coupled to the rejected seed channel.

7. The system according to claim 5 further comprising a rejected seed outlet for receiving the rejected seeds from the seed channel, the rejected seed outlet coupled to the rejected seed channel.

8. The system according to claim 1 wherein the evaluation channel section comprises an upstream seed channel between a seed hopper and an entrance port to the seed meter or between a pneumatic supply tube and an entrance port to the seed meter.

9. The system according to claim 1 wherein the evaluation channel section comprises a downstream evaluation channel that is associated with a channel that receives seed from the seed meter, where the channel is associated with the conveyer.

10. The system according to claim 1 wherein the evaluation channel section is associated with a channel between the exit port of the seed meter and the discharge port.

11. The system according to claim 1 further comprising:
    a second source of an electromagnetic signal for illuminating or radiating the evaluation channel, where the electromagnetic signal comprises a pulse with at a secondary reference phase and secondary reference magnitude;
    a second receiver of the electromagnetic signal, the second receiver comprising a detector to measure a seed-related characteristic based on a secondary observed phase and a secondary observed magnitude;
    a secondary evaluator to evaluate a third difference between the secondary reference phase and the secondary observed phase and a fourth difference between the secondary reference magnitude and secondary observed magnitude to estimate a seed-related characteristic of one or more seeds in the series of seeds in the evaluation channel section; and
    a controller for controlling the seed treatment device to spray or dispense a seed treatment that corresponds to one or more seed-related characteristics estimated by the evaluators.

12. The system according to claim 1 wherein the electromagnetic signal comprises one or more of the following signals: infrared, near-infrared, ultraviolet, microwave, optical, X-ray, ultrasonic and thermal.

13. The system according to claim 1 wherein the seed treatment comprises one or more of the following crop inputs: fertilizer, nutrient, minerals, calcium, insecticide, herbicide, fungicide, miticide, inoculation, water, insect-targeting bacteria, and insect-targeting virus.

14. The system according to claim 1 further comprising:
    an electronic data processor or the evaluator is configured to identify a nonviable seed, sterile seed, previously diseased non-infectious seed, moldy seed, deformed seed, decayed seed, cracked seed, seed fragments, incorrect seed type, incorrect seed species, untreated seeds, uncoated seeds, or any other seed characteristics which are deemed safe, without material risk of contamination or infection of the planted seeds or crop, or in accordance with practices for disposal in the field or on the ground.

15. The system according to claim 1 further comprising:
    an electronic data processor or the valve control module is configured to control a primary bypass valve and a secondary bypass valve to divert nonviable, previously diseased, currently diseased, infected, insect-infested, moldy, deformed, decayed, cracked, seed fragments, incorrect seed, or other rejected seeds to a container or seed collector, where the rejected seeds, or rejected seed portions, cannot contaminate or infect the planted seeds or crop in the field.

16. The system according to claim 1 further comprising:
an electronic data processor or the valve control module is configured to control a primary bypass valve and a secondary bypass valve via one or more electromagnetic actuators, to divert, route or direct a first species of a particular seed to the discharge port of the conveyer for planting; and
the electronic data processor or the valve control module is configured to control the primary bypass valve to divert, route or direct a second species of a particular seed to a container.

17. The system according to claim 1 further comprising:
an electronic data processor or evaluator is configured to evaluate or determine seed viability based on the first-seed related characteristic, the second seed-related characteristic, and a corresponding viability parameter in the reference data or seed database stored within the data storage device.

18. The system according to claim 17 wherein the electromagnetic signal comprises X-ray radiation to indicate whether or not an embryo of a legume seed or bean seed is viable.

19. The system according to claim 1 further comprising:
an electronic data processor or evaluator is configured to evaluate or determine an observed phase, an observed attenuation or both at one or more frequency bands of sensors to detect, identify or characterize abnormal seed properties or seed characteristics that indicate nonviability, where any probability of germination is below a threshold minimum germination comprising any of the following determined seed characteristics: (a) seed size outside of normal range of seed size; (b) seed structural defects, such as cracked seeds or fragmented seeds; (c) presence of material mold or fungus; (d) identification or differentiation of debris from seed.

20. The system according to claim 1 further comprising:
an electronic data processor or evaluator is configured to evaluate or determine, for a particular seed sampled in the evaluation channel during a sampling interval, if a first seed-related characteristic, a second seed related characteristic, or both indicate that the particular seed meets target seed specifications comprising an absence of or non-detection of any material defect that tends to decrease crop performance or yield associated with the particular seed.

* * * * *